(12) United States Patent
Ohtsuka et al.

(10) Patent No.: US 8,004,532 B2
(45) Date of Patent: Aug. 23, 2011

(54) SERVER APPARATUS AND SERVER CONTROL METHOD IN COMPUTER SYSTEM

(75) Inventors: Toshihiko Ohtsuka, Ome (JP); Takayuki Hirotani, Akiruno (JP)

(73) Assignee: Casio Computer Co., Ltd, Tokyo (JP)

( * ) Notice: Subject to any disclaimer, the term of this patent is extended or adjusted under 35 U.S.C. 154(b) by 1179 days.

(21) Appl. No.: 11/693,351

(22) Filed: Mar. 29, 2007

(65) Prior Publication Data

US 2007/0245021 A1    Oct. 18, 2007

(30) Foreign Application Priority Data

Mar. 29, 2006    (JP) ................... 2006-091627

(51) Int. Cl.
*G06F 15/80*    (2006.01)
*G06F 15/16*    (2006.01)

(52) U.S. Cl. ...................... 345/505; 345/503

(58) Field of Classification Search ............ 345/503, 345/505

See application file for complete search history.

(56) References Cited

U.S. PATENT DOCUMENTS

| | | | | |
|---|---|---|---|---|
| 5,847,705 A * | 12/1998 | Pope | ................... | 715/790 |
| 6,006,231 A | 12/1999 | Popa | | |
| 6,191,800 B1 * | 2/2001 | Arenburg et al. | .......... | 345/505 |
| 6,559,855 B1 * | 5/2003 | Kawase et al. | ............. | 345/596 |
| 6,885,376 B2 * | 4/2005 | Tang-Petersen et al. | ..... | 345/506 |
| 6,950,848 B1 * | 9/2005 | Yousefi'zadeh | ........... | 709/203 |
| 6,970,929 B2 * | 11/2005 | Bae et al. | ................ | 709/226 |
| 6,988,138 B1 * | 1/2006 | Alcorn et al. | .............. | 709/225 |
| 7,027,072 B1 * | 4/2006 | Sadowski | .................. | 345/629 |
| 7,075,541 B2 * | 7/2006 | Diard | ...................... | 345/505 |
| 7,171,444 B2 * | 1/2007 | Deshpande | ............... | 709/203 |
| 7,358,974 B2 * | 4/2008 | Blythe et al. | ............... | 345/505 |
| 7,649,537 B2 * | 1/2010 | Campbell et al. | ........... | 345/502 |
| 2003/0093568 A1 | 5/2003 | Deshpande | | |
| 2003/0128216 A1 * | 7/2003 | Walls et al. | ................ | 345/506 |
| 2004/0215792 A1 * | 10/2004 | Koning et al. | .............. | 709/229 |

FOREIGN PATENT DOCUMENTS

| | | |
|---|---|---|
| EP | 0689342 | 12/1995 |
| GB | 2331600 | 5/1999 |
| JP | 09-069163 | 3/1997 |

(Continued)

OTHER PUBLICATIONS

Written Opinion of PCT/JP2007/057506 dated Jul. 20, 2007.

(Continued)

*Primary Examiner* — Daniel Washburn
(74) *Attorney, Agent, or Firm* — Turocy & Watson, LLP

(57) ABSTRACT

A server apparatus and a server control method which transmits display data to a client apparatus and which displays the display data on a display screen of the client apparatus, wherein there are provided a plurality of accelerators, each of the plurality of accelerators being equipped with a difference detection circuit which compares the display data for a previous screen transmitted to the client apparatus with the display data for a current screen to be transmitted to the client apparatus to detect a difference therebetween. Then, the size of a drawing area to be allocated to each of the plurality of accelerators is calculated for each of the accelerators in response to a request from the client apparatus, and when a display request is made from a new client apparatus, the accelerator having a smaller drawing area among the calculated drawing areas is allocated to the new client apparatus.

4 Claims, 25 Drawing Sheets

| | FOREIGN PATENT DOCUMENTS | |
|---|---|---|
| JP | 2003-503780 | 1/2003 |
| JP | 2003-158534 | 5/2003 |
| JP | 2004-503862 | 2/2004 |
| JP | 2004-171063 | 6/2004 |
| JP | 2005-284694 | 10/2005 |
| JP | 2005-322107 | 11/2005 |
| WO | 0197014 A2 | 12/2001 |

OTHER PUBLICATIONS

International Search Report for PCT/JP2007/057506 dated Jul. 20, 2007.

Japanese Office Action for Japanese Application No. 2006-091627 Mailed on Jan. 25, 2010.

* cited by examiner

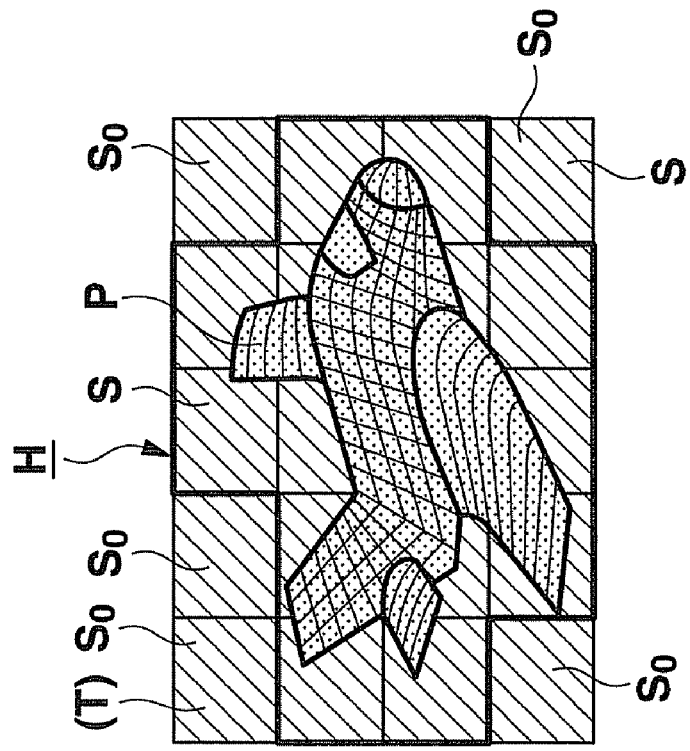
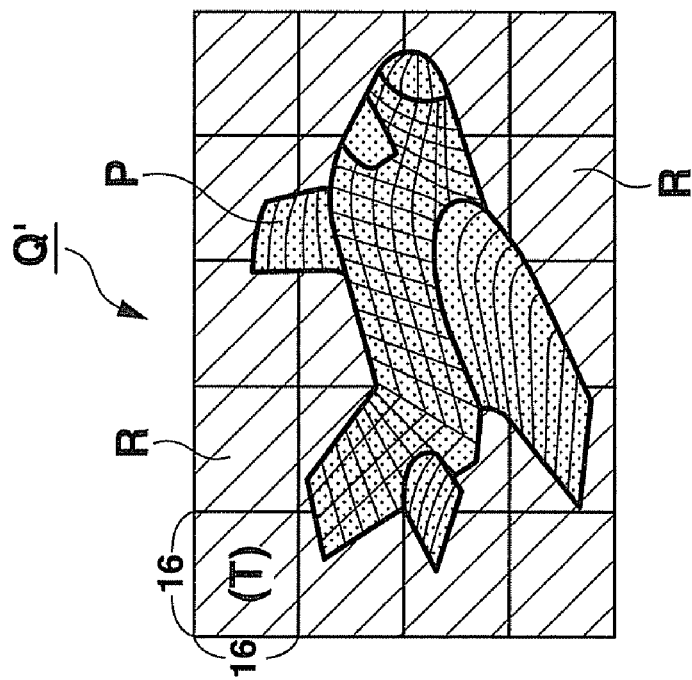
FIG.3B
FIG.3A

FIG.13

| ENCODE VALUE | ENCODING METHOD | X | Y | Z | RAW |
|---|---|---|---|---|---|
| R← | RRE | ○ | | | |
| G← | PNG | | ○ | | |
| J9← | JPEG (Quality9) | | | ○ | |
| RAW← | RAW (NO ENCODE PROCESSING) | | | | ○ |

X...NUMBER OF COLORS IS ONE OR TWO
Y...NUMBER OF COLORS<128
Z...NUMBER OF COLORS≧128

FIG.14

| ENCODING METHOD | SERIAL NUMBER | POSITIONAL INFORMATION | HEIGHT AND WIDTH | ENCODE INFORMATION | PENETRATION COLOR | DATA LENGTH | TRANSFER FLAG |
|---|---|---|---|---|---|---|---|
| RAW | No. | X, Y | H, W | 0x0 | | NUMBER OF BYTES | TRANSFERRED/NOT TRANSFERRED |
| RRE | No. | X, Y | H, W | 0x1 | | NUMBER OF BYTES | TRANSFERRED/NOT TRANSFERRED |
| PNG | No. | X, Y | H, W | 0x2 | | NUMBER OF BYTES | TRANSFERRED/NOT TRANSFERRED |
| JPEG | No. | X, Y | H, W | 0x3 | | NUMBER OF BYTES | TRANSFERRED/NOT TRANSFERRED |
| PENETRATION | No. | X, Y | H, W | 0xF | COLOR DATA | NUMBER OF BYTES | TRANSFERRED/NOT TRANSFERRED |

SERVER APPARATUS AND SERVER CONTROL METHOD IN COMPUTER SYSTEM

CROSS-REFERENCE TO RELATED APPLICATIONS

This application is based upon and claims the benefit of priority from prior Japanese Patent Application No. 2006-091627, filed Mar. 29, 2006, the entire contents of which are incorporated herein by reference.

BACKGROUND OF THE INVENTION

1. Field of the Invention

The present invention relates to a server apparatus and a server control method in a computer system wherein display data generated in the server apparatus is transmitted to a client apparatus and displayed on its display screen.

2. Description of the Related Art

Recently, a technical idea called server-based computing has been proposed. The server-based computing is as follows: in a system in which client apparatuses such as terminals are interconnected with a server apparatus via a network, if the client apparatus requests a service from the server apparatus, the server apparatus manages data and operates a particular application program on the basis of the request for service from the client apparatus.

The client apparatus sends information on the operation of keys or a mouse of a user to the server apparatus via the network, and also displays data received from the server apparatus. The client apparatus is called a thin client because the client apparatus has only to comprise network equipment, a display device, and input devices such as the mouse and keyboard and does not have data therein. The thin client has a light load of necessary processing because it requires no storage such as a hard disk and does not execute any application program.

By the introduction of the server-based computing, companies can consolidate the management of resources such as data and application programs on the server side, and can therefore reduce operation costs. Moreover, the client apparatus has an advantage that it can be provided at a lower cost than conventional personal computers. In terms of security, access to the data within the server apparatus is limited, and access logs are kept, such that the risk of illegal access to information can be reduced. Viruses can be collectively dealt with by the server apparatus. A configuration has been disclosed wherein in such a computer system comprising the thin clients, display data for application software to be executed on the server side is transmitted to and displayed on the client apparatus (e.g., refer to PCT National Publication No. 2004-503862.)

In such a server apparatus, a CPU of the server apparatus bears a load because the display data transmitted to the client apparatus is generated by software processing, and especially when the server apparatus comprises a plurality of accelerators, no consideration has been given to a method of optimally controlling these accelerators.

BRIEF SUMMARY OF THE INVENTION

The present invention is directed to provide a server apparatus and a server control method in a computer system which can optimally control a plurality of accelerators in accordance with each client to increase the efficiency of the use of the accelerators.

The present invention provides a server apparatus and a server control method in a computer system which transmits display data generated in the server apparatus to a client apparatus and which displays the display data on a display screen of the client apparatus, wherein there are provided a plurality of accelerators, each of the plurality of accelerators being equipped with a difference detection circuit which compares the display data for a previous screen transmitted to the client apparatus with the display data for a current screen to be transmitted to the client apparatus to detect a difference therebetween. The size of a drawing area to be allocated to each of the plurality of accelerators is calculated for each accelerator in response to a request from the client apparatus, and when a display request is made from a new client apparatus, the accelerator having a smaller drawing area among the calculated drawing areas is allocated to the new client apparatus.

According to the server apparatus and the server control method of the present invention, the plurality of accelerators are optimally controlled in accordance with each client, that is, a load on the accelerator is determined depending on the drawing area of the client to optimize the allocation of the accelerator, so that it is possible to increase the efficiency of the use of the accelerators. This enables an increase in the velocity of response to each client, as well as an increase in the number of clients to be connected.

Furthermore, according to the server apparatus and the server control method of the present invention, the plurality of accelerators are optimally controlled in accordance with each client, that is, the optimum accelerator is allocated to the client which has made a request depending on how the accelerators are used so that the loads on the accelerators are equal, thereby making it possible to increase the efficiency of the use of the accelerators. This enables an increase in the velocity of response to each client, as well as an increase in the number of clients to be connected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 3A and 3B are diagrams showing in detail transfer drawing data H generated by an accelerator circuit 101 on the basis of an area Q' of drawing data G' after change in the server apparatus 10 of the present computer system;

FIG. 13 is a diagram showing a table for deciding a compression method;

FIG. 14 is a diagram showing one example of a table for result data and header formats;

DETAILED DESCRIPTION OF THE INVENTION

Figure 1:
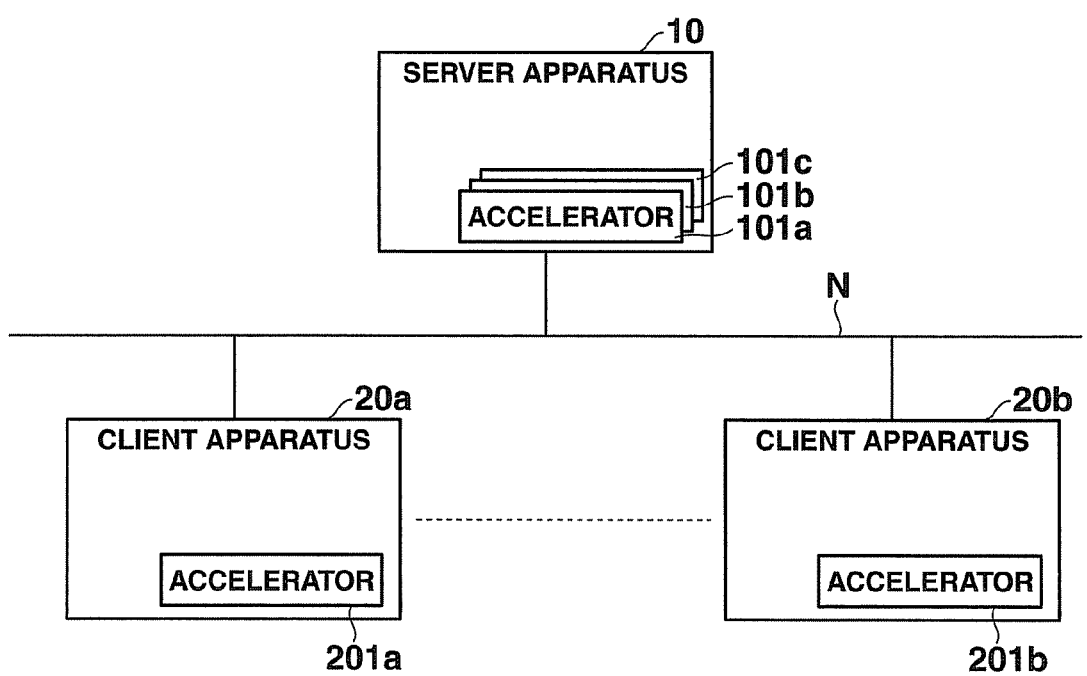
FIG. 1 is a block diagram showing a schematic configuration of a computer system comprising a server apparatus 10 according to an embodiment of the present invention, and a plurality of client apparatuses 20a, 20b, . . .

FIG. 1 is a block diagram showing a schematic configuration of a computer system comprising a server apparatus 10 according to an embodiment of the present invention, and a plurality of client apparatuses 20*a*, 20*b*, . . . (hereinafter representatively indicated by 20). The server apparatus 10 and the plurality of client apparatuses 20 are connected via a network N including, for example, a local area network (LAN) or a wide area network (WAN).

The server apparatus 10 stores a plurality of application programs such as a document creation processing program, a spreadsheet program, a mail processing program, an Internet connection processing program and a Web display program, and the server apparatus 10 starts the corresponding application program and executes its processing in response to an operation input signal from the client apparatus 20.

Then, a data file created in connection with various kinds of processing started and executed in the server apparatus 10 in accordance with the operation input signal from the client apparatus 20 is stored and saved for each user account or as a shared file in a storage device such as a magnetic disk which is in the server apparatus 10 or which is connected to and managed by the server apparatus 10.

In this server apparatus 10, display data (drawing data) generated in connection with the execution of the started application program is converted into transfer display data by an accelerator circuit 101*a*, 101*b*, on a circuit board properly allocated to correspond to the respective client apparatuses 20. Then, the display data is compressed by a compression mode suitable for, for example, the size of the drawing area of this display data and for the state of a communication with the client apparatus 20, and then encrypted. Thus, the display data is transmitted to the client apparatus 20 which is the source of access.

On the other hand, the client apparatus 20 decodes the display data transmitted from the server apparatus 10 by an accelerator circuit 201*a*, 201*b*, . . . on a circuit board disposed within the client apparatus 20, and displays the display data on a display unit thereof.

Each client apparatus 20 in this computer system has only to receive the display data transmitted from the server apparatus 10 and displays it on the display unit thereof, and therefore has no need to have its own application function and management function for the data files as long as it has input functions corresponding to user operations such as a keyboard and a mouse, and output functions such as an LCD unit and a printer.

Here, the outline of the function of generating the transfer display data in the accelerator circuit 101 of the server apparatus 10 will be described.

Figure 2C:
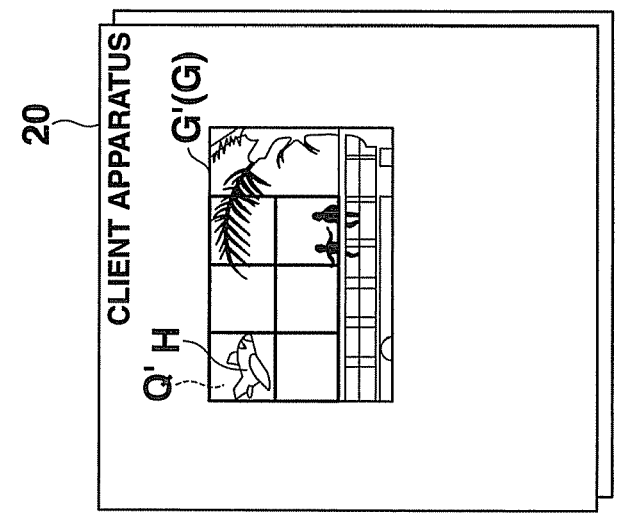
FIGS. 2A, 2B and 2C are diagrams showing how drawing data generated by the server apparatus 10 of the present computer system is transferred to and displayed on the client apparatus 20.

FIG. 2 are diagrams showing how the drawing data generated by the server apparatus 10 of the present computer system is transferred to and displayed on the client apparatus 20; wherein (A) is a diagram showing how the drawing data changes in the server apparatus 10, (B) is a diagram showing the transfer drawing data during the change of the drawing data, and (C) is a diagram showing how the transferred drawing data is displayed/output in the client apparatus 20.

Figure 2B:
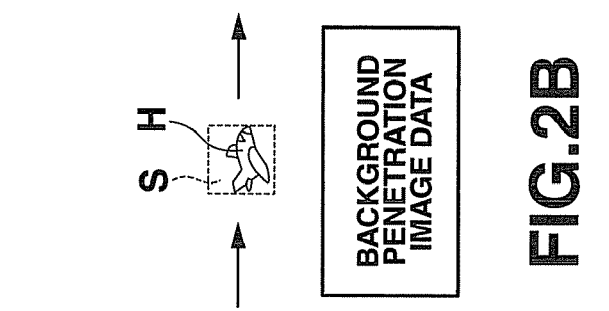

In the server apparatus 10, when drawing data (before change) G already generated in accordance with the working application program and transferred to the client apparatus 20 changes into drawing data (after change) G' along with the operation of the application program, an area Q' corresponding to a changed part P of the drawing data G' after change is first cut out, and the drawing data in this cut area Q' is converted into transfer drawing data H as shown in FIG. 2(B) by the accelerator circuit 101.

The accelerator circuit 101 performs image comparison between the area Q' cut out of the drawing data G' after change in accordance with its changed part P and the same area Q in drawing data G before change in order to convert a background matching area R therein into transmitted drawing data S (penetration color data which does not need to be rewritten), thereby generating the transfer drawing data H. The client apparatus 20 which has received this transfer drawing data H writes the newly received transfer drawing data H except for the transmitted image data S at a coordinate position corresponding to the area Q' with the image change on the already received and displayed drawing data G before change, so that the transfer drawing data H can be displayed including the drawing data G' after change.

In addition, the transfer drawing data H generated by the accelerator circuit 101 of the server apparatus 10 is transferred after compressed by a compression mode suitable in terms of both compression efficiency and image quality selected in accordance with the contents (the number of colors) of the drawing data and the state of a communication with the client apparatus 20 (response speed) at that point, so that it is possible to further reduce the amount of transferred drawing data without decreasing drawing quality.

FIG. 3 are diagrams showing in detail the transfer drawing data H generated by the accelerator circuit 101 on the basis of the area Q' of the drawing data G' after change in the server apparatus 10 of the present computer system.

Figure 2A:
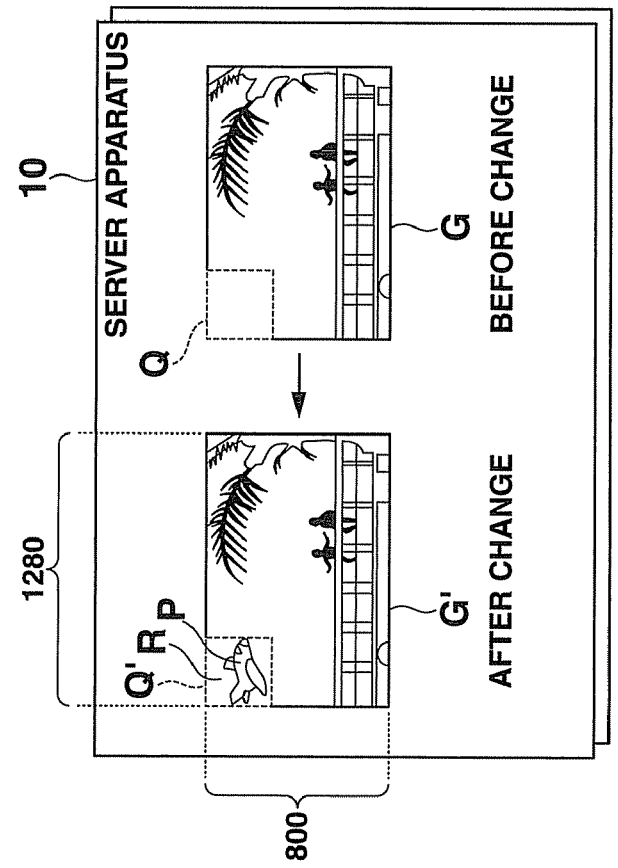

For example, as shown in FIG. 2(A), when the area size of the drawing data G (G') for one screen processed in the server apparatus 10 is 1280×800 pixels, the area Q' including the image change part P in the drawing data G' after change is cut out with reference to a tile unit in which 16×16 pixels=1 tile (T), as shown in FIG. 3(A).

It is to be noted that the areas of tiles T for one line in a horizontal direction are collectively called one block in the area Q' including the image change part P in the drawing data G' after change.

Moreover, the area Q' is a rectangular area Q' in which the image change part P is cut out in the horizontal and vertical directions, but may also be a zonal area Q' in which the size (lateral) of the area cut out only in the horizontal direction is the size of the area of the drawing data G (G') itself.

The accelerator circuit 101 performs image comparison of the area Q' including the image change part P with the area Q at the same position in the drawing data G before change in units of tiles, and converts image pixels of the background matching area R therein into the transmitted drawing data S (color data which does not need to be rewritten), as shown in FIG. 3(B). Then, a penetration color tile So in which the whole area of one tile (T) has been converted into the transmitted drawing data S is not transferred, and the tiles including the image change part P alone are transferred to the client apparatus 20 together with the coordinate positions of these tiles on the display screen after the areas having differences with respect to the drawing data G before change are compressed by a suitable compression mode. As a result, the part corresponding to the transfer drawing data H out of the area Q' including the image change part P is transferred to the client apparatus 20.

The accelerator circuit 201 of the client apparatus 20 decodes the transfer drawing data H transferred after compressed in units of tiles with respect to the drawing data G before change, and then writes the transfer drawing data H at the coordinate positions of the tiles by simply removing the image pixels converted into the penetration drawing data S, thereby making it possible to display the drawing data G' after change generated in the server apparatus 10.

The transfer drawing data H generated in the accelerator circuit 101 of the server apparatus 10 is optimally compressed and encrypted and then transferred to the client apparatus 20, and in the compression mode such as Graphic Interchange Format (GIF)/Portable Network Graphic (PNG), the compression efficiency can be increased without decreasing image quality if image pixels constituting image data to be compressed are more adjacent to and continuous from each other in the same color. Thus, the compression ratio in the area of the drawing data converted to the penetration drawing data S within the transfer drawing data H as described above is significantly high.

Therefore, it is possible not only to significantly reduce the amount of drawing data transferred from the server apparatus 10 to the client apparatus 20 without decreasing the drawing quality, but also to generate and compress the transfer drawing data H in the accelerator circuit 101 as hardware, so that a processing load in the server apparatus 10 can be drastically reduced, and, for example, the addition of the client apparatuses 20a, 20b, . . . can be facilitated.

Figure 4:
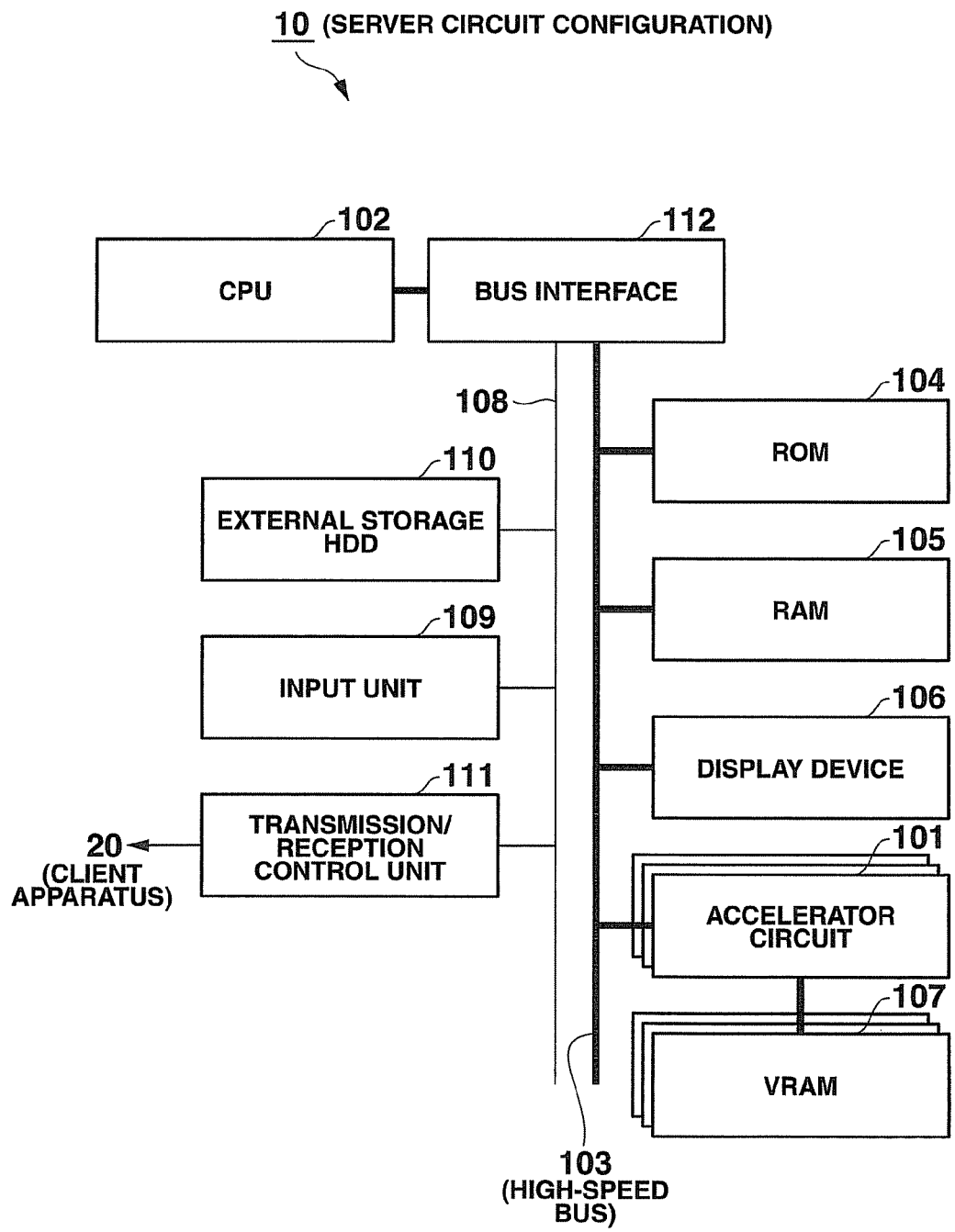
FIG. 4 is a block diagram showing a circuit configuration of the server apparatus 10 in the present computer system.

FIG. 4 is a block diagram showing a circuit configuration of the server apparatus 10 in the present computer system.

The server apparatus 10 comprises a CPU 102 as a computer. To the CPU 102, a ROM 104, a RAM 105 and a display device 106 are connected via a bus interface 112 and a high-speed bus 103, and the plurality of accelerator circuits 101 are also connected. A plurality of VRAMs 107 are connected to the plurality of accelerator circuits 101.

There are also connected, to the CPU 102 via a normal bus 108, an input unit 109 such as a keyboard, an external storage hard disk drive (HDD) 110, and a control unit 111 for transmission to/reception from the client apparatus 20.

The CPU 102 controls the operations of the components of the circuits using the RAM 105 as a work memory in accordance with a system program or the various application programs stored in the ROM 104 in advance. The various programs are started and executed, for example, in response to a key input signal from the input unit 109 or a processing command signal corresponding to the user operation from the client apparatus 20 received via the transmission/reception control unit 111.

In this server apparatus 10, various kinds of data generated in accordance with the application programs started and executed in response to a user instruction signal from the client apparatus 20 are stored in the external storage HDD 110, for example, to correspond to an ID of the user. Moreover, display drawing data is converted to the transfer drawing data H (see FIG. 2 and FIG. 3) using the VRAMs 107 in the accelerator circuit 101, optimally compressed and encrypted, and then transferred from the transmission/reception control unit 111 to the client apparatus 20 where the drawing data is displayed and output.

Figure 5:
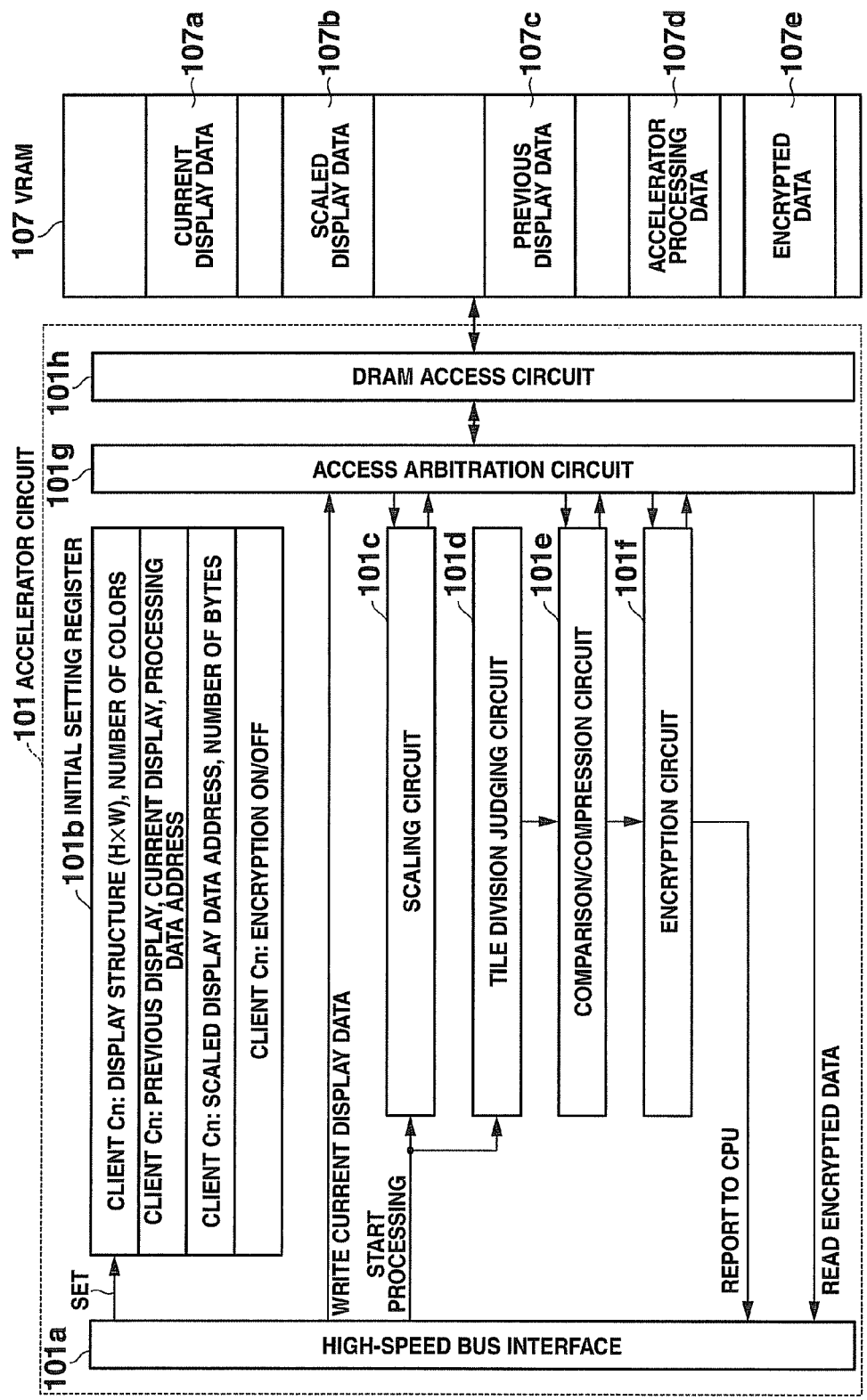
FIG. 5 is a block diagram showing the configuration of the accelerator circuit 101 in the server apparatus 10 of the present computer system.

FIG. 5 is a block diagram showing the configuration of the accelerator circuit 101 in the server apparatus 10 of the present computer system.

In this accelerator circuit 101, an initial setting register 101b is set by initial setting from the CPU 102. Here, for each client Cn to be connected, there are set the designation of a memory area 107a on the VRAM 107 for storing current display data, the designation of a memory area 107c on the VRAM 107 for storing previous display data, the designation of a memory area 107b on the VRAM 107 for storing scaled display data, the designation of a memory area 107d on the VRAM 107 for storing accelerator processing data, the number of bytes, and whether to implement encryption (on/off), in addition to a display structure (height H×width W of one screen) of the client Cn and the number of colors.

The display data transmitted to the client apparatus 20 is generated in the following manner. First, the display data is input to the accelerator circuit 101 via a high-speed bus interface 101a. This display data is stored as the current display data in the memory area 107a on the VRAM 107 via an access arbitration circuit 101g and a DRAM access circuit 101h. Then, when a command to start processing is input from the CPU 102, a scaling circuit 101c as a magnification changing circuit reads the current display data stored in the memory area 107a to scale (here, reduce) the current display data. The scaled display data is stored in the memory area 107b. Moreover, a tile division judging circuit 101d as an area dividing circuit sets in a register the number of tiles as a unit for implementing tile division when a command is given from the CPU 102.

Next, a comparison/compression circuit 101e reads the current display data stored in the memory area 107a (the scaled display data stored in the memory area 107b in the case where scaling processing has been performed), and the previous display data stored in the memory area 107c. The comparison/compression circuit 101e divides the respective data in accordance with the number of tiles sent from the tile division judging circuit 101d, and compares these display data tile by tile to detect a difference. Then, the display data having a difference detected by this comparison is compressed, and stored as the accelerator processing data in the memory area 107d. When encryption is set, the display data is encrypted in an encryption circuit 101f, and then stored in a memory area 107e. At the same time, the termination of a series of processing in the accelerator circuit 101 is reported to the CPU 102 via the high-speed bus interface 101a. On receipt of this report, the CPU 102 reads the accelerator processing data in the memory area 107d or the encrypted data stored in the memory area 107e, and transfers the data to the client apparatus 20.

It is to be noted that the changing of the magnification of the display data, the division of the area, and the detection of the presence of a difference between the previous screen display data and the current screen display data are processing for reducing the amount of transmitted data and increasing the transfer efficiency. Moreover, a case of reduction is described as an example of the changing of the magnification in the embodiment, but a case of enlargement is also possible.

Figure 6:
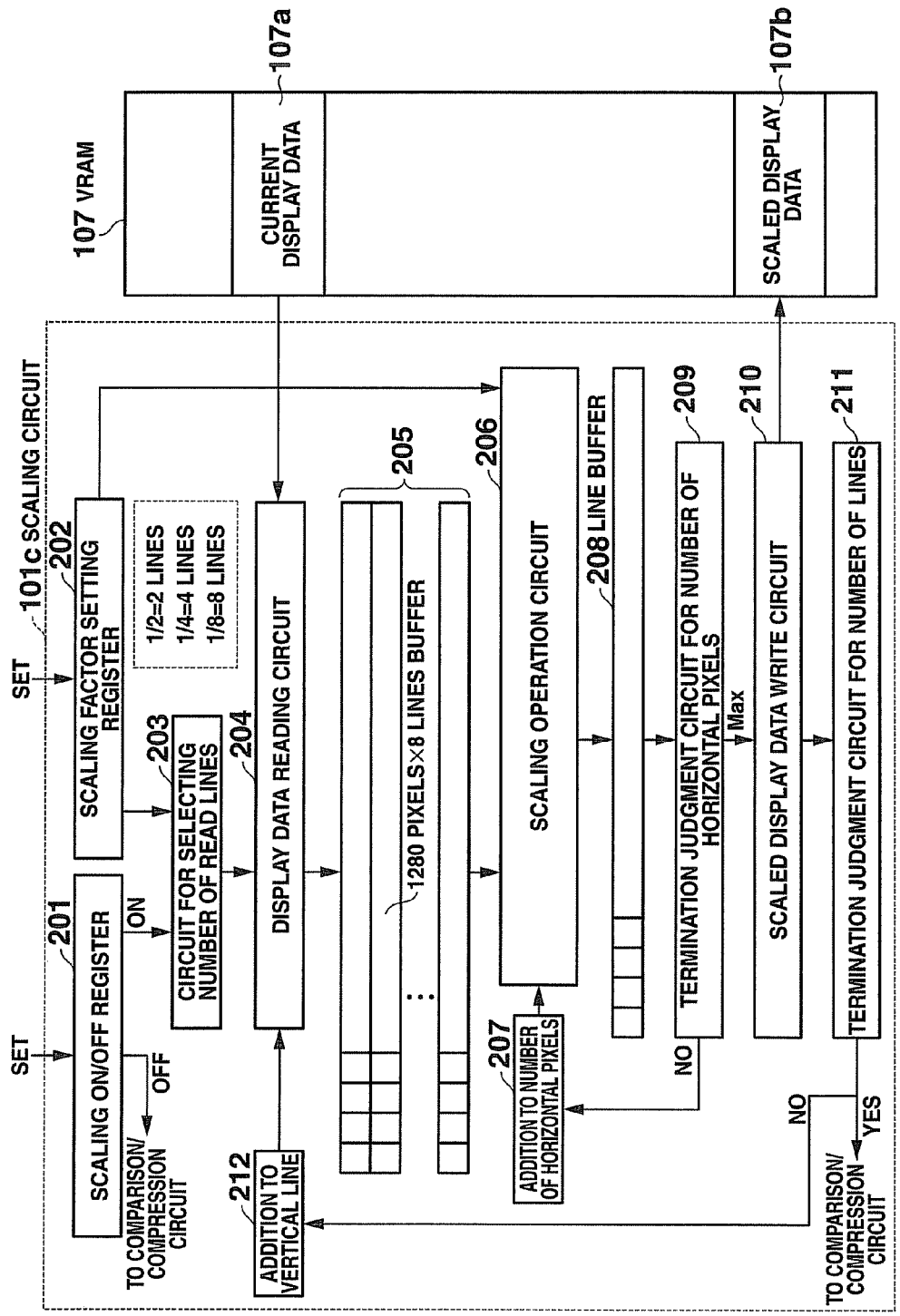
FIG. 6 is a block diagram showing the configuration of a scaling circuit 101*c*.

FIG. 6 is a block diagram showing the configuration of the scaling circuit 101c shown in FIG. 5. Whether to perform the scaling processing is specified for each client apparatus 20. Scaling-on is written in a scaling on/off register 201 when the scaling is performed, and scaling-off is written in the scaling on/off register 201 when the scaling is not performed. Further, a scaling factor when the scaling is performed is set in a scaling factor setting register 202. When scaling-off is specified, the processing is handed over to the comparison/compression circuit 101e without performing scaling. When the scaling is on, a circuit 203 for selecting the number of read lines selects the number of lines of the display data to be read from the memory area 107a within the VRAM 107 in accordance with the scaling factor set in the scaling factor setting register 202. For example, two lines are selected when the scaling factor is ½, four lines are selected when the scaling factor is ¼, or eight lines are selected when the scaling factor is ⅛. A case assuming a scaling factor of ¼ will be described below. In addition, when the display data is composed of 1280 pixels in the horizontal direction*800 pixels in the vertical direction, one line is a group of pixels in one horizontal line composed of 1280*1 pixels.

A display data reading circuit 204 reads, from the memory area 107a, the display data for the number of lines (4 lines here) selected by the circuit 203 for is selecting the number of read lines, and stores the display data in a buffer 205 having a capacity of 1280 pixels×8 lines. Then, a scaling operation circuit 206 performs the scaling processing on the basis of the display data of 4×4 pixels as a scaling unit to acquire image data of single pixel, and then stores the image data in a line buffer 208.

A termination judgment circuit 209 for the number of horizontal pixels judges whether the number of horizontal pixels has reached 1280, and when 1280 pixels are not reached, adds pixels (4 pixels here) of the scaling unit in a circuit 207 for addition to the number of horizontal pixels to perform the scaling processing in the scaling operation circuit 206 on the basis of the display data of the next 4×4 pixels as the scaling unit. When it is judged in the termination judgment circuit 209 for the number of horizontal pixels that the number of horizontal pixels has reached 1280, scaled display data is written as the scaled display data 107b in the VRAM 107 by a scaled display data write circuit 210.

Figure 7:
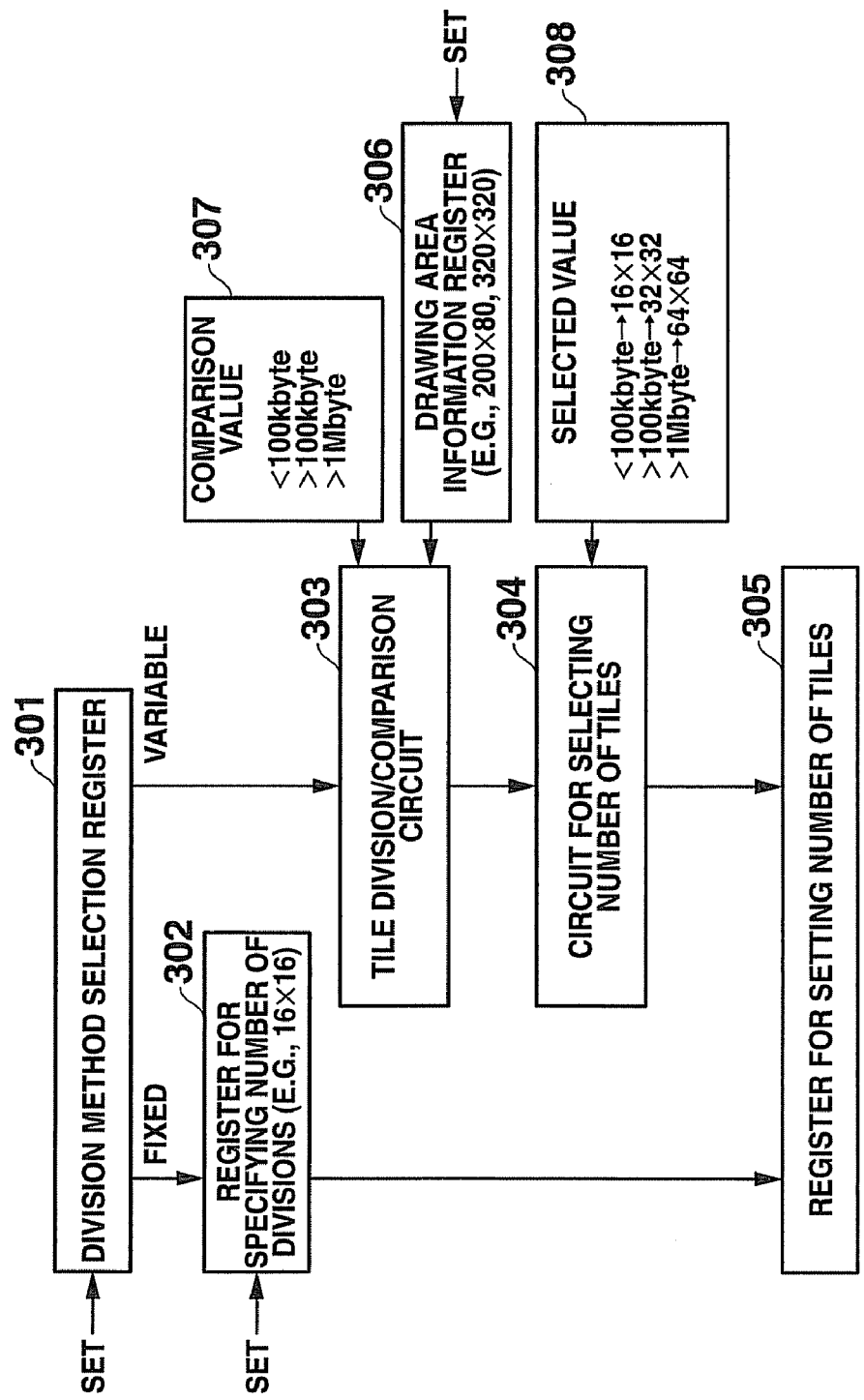
FIG. 7 is a block diagram showing the configuration of a tile division judging circuit 101*d*.

Furthermore, a termination judgment circuit 211 for the number of lines judges whether the number of vertical lines has reached 800. When 800 lines are not reached, a circuit 212 for addition to vertical lines adds a predetermined number of lines to be read (4 lines here), and the display data reading circuit 204 then reads the display data of the next lines (next 4 lines here) from the memory area 107a, and stores the display data in buffer 205 having a capacity of 1280 pixels×8 lines. When it is judged in the termination judgment circuit 211 for the number of lines that the number of vertical lines has reached 800 lines, this is reported to the comparison/compression circuit 101e, thereby starting the operation of the comparison/compression circuit 101e. FIG. 7 is a block diagram showing the configuration of the tile division judging circuit 101d shown in FIG. 5. Whether to use a fixed or variable tile division method is set in a division method selection register 301 by the CPU 102. Moreover, the number of tile divisions indicating the size of one tile is set by the CPU 102 in a register 302 for specifying the number of divisions. When the division method is fixed, the number of divisions (e.g., 16×16) specified by the register 302 for specifying the number of divisions is set in a register 305 for setting the number of tiles.

On the other hand, when the tile division method is variable, a tile division/comparison circuit 303 reads a drawing area (H×W) from a drawing area information register 306 set by the CPU 102, and judges whether the data amount of the drawing area is larger or smaller than 100 kilobytes in comparison with a referential comparison value 307, or is 1 megabyte or more. A circuit 304 for selecting the number of tiles selects a proper number of tiles from a plurality of selection values 308 in accordance with the result of this judgment. For example, 16×16 is selected when the data amount is smaller than 100 kilobytes, or 32×32 is selected when the data amount is larger than 100 kilobytes, or 64×64 is selected when the data amount is 1 megabyte or more. Thus, the larger the data amount is, the larger the selected number of tiles is. The number of tiles selected here is set in the register 305 for setting the number of tiles.

Figure 8:
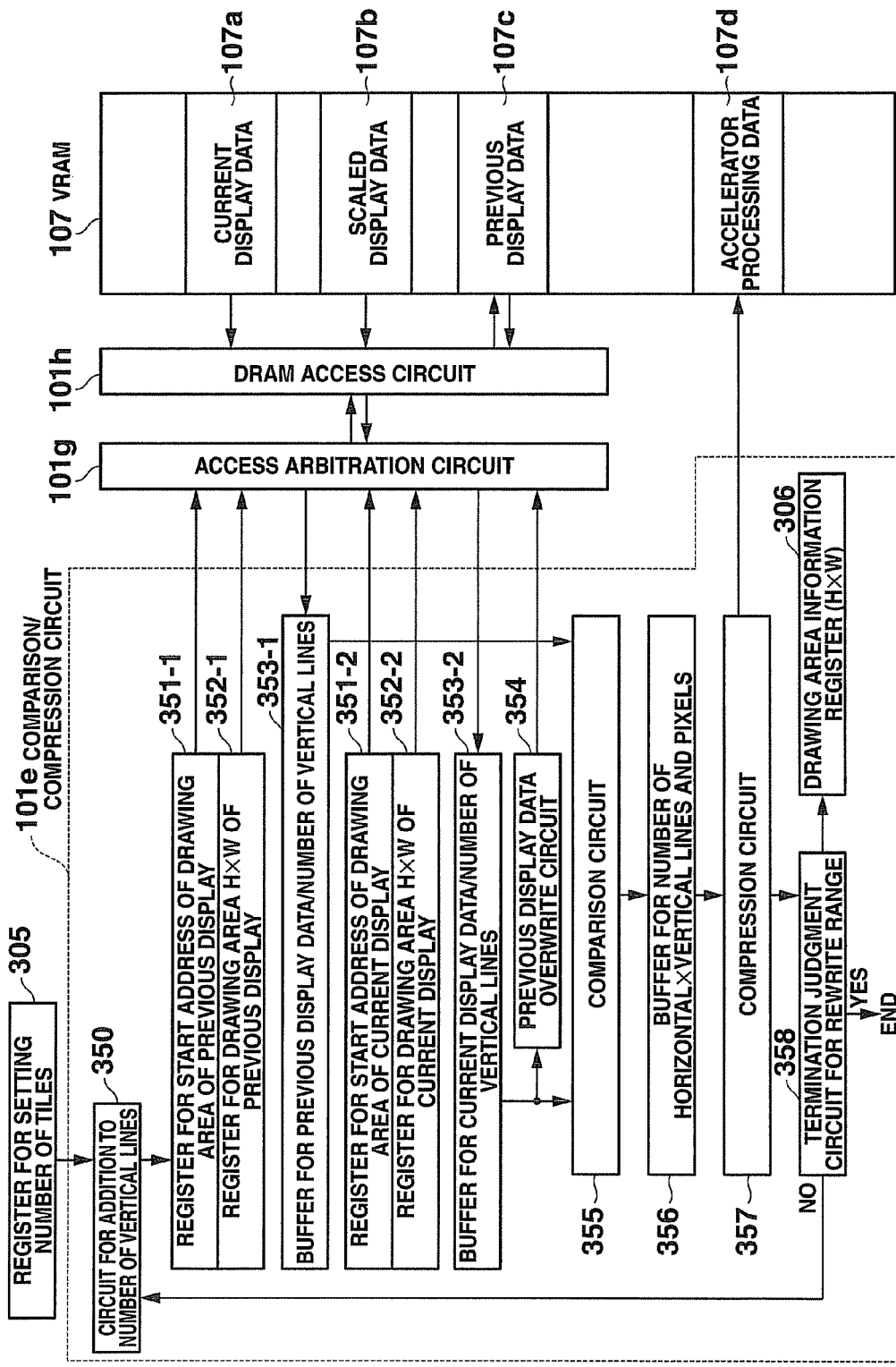
FIG. 8 is a block diagram showing the configuration of a comparison/compression circuit.
Figure 9:
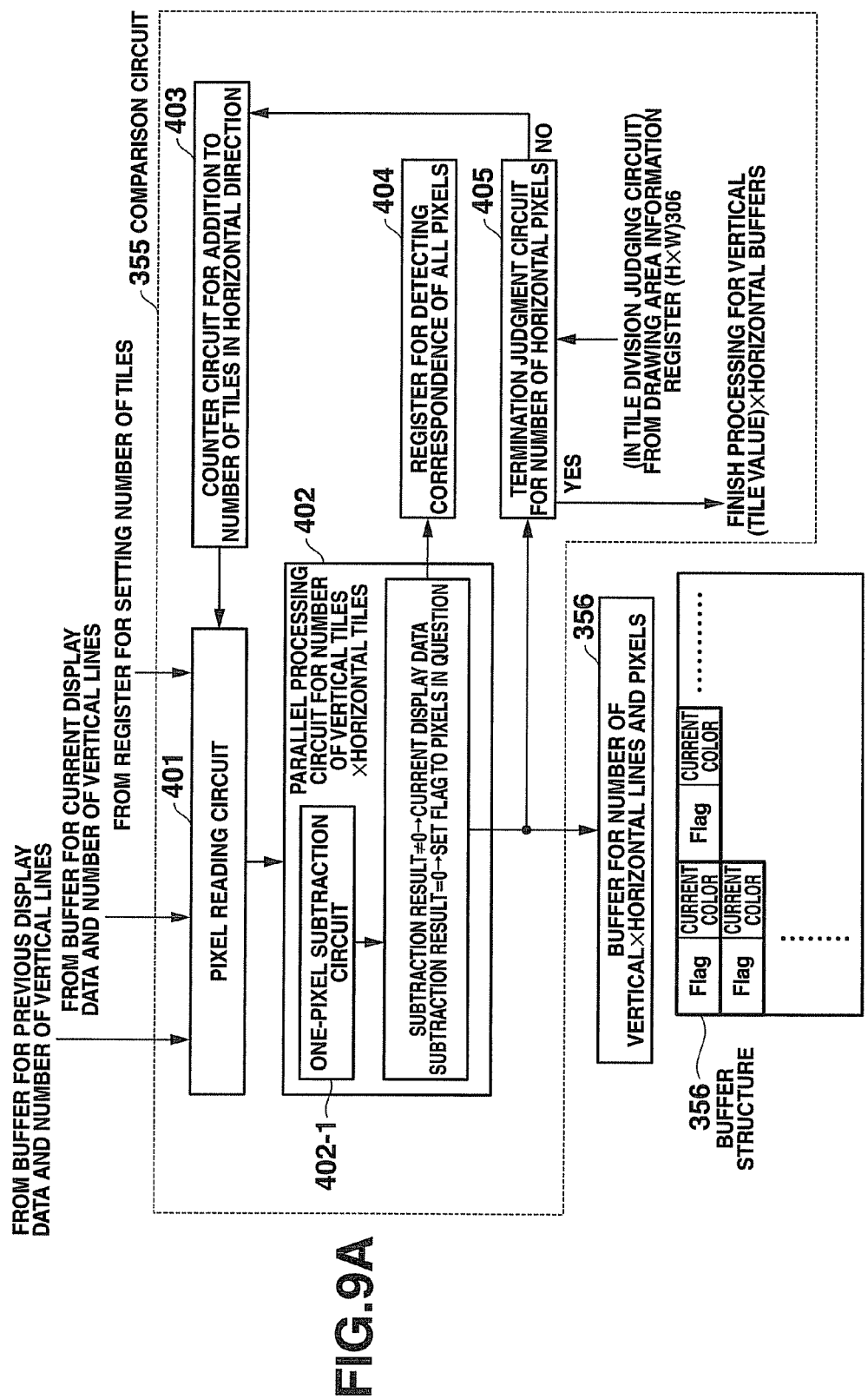
FIG. 9A is a diagram showing a detailed configuration of a comparison circuit shown in FIG. 8.
FIG. 9B is a diagram showing one example of the structure of a buffer 356 for the number of vertical×horizontal lines and pixels.

FIG. 8 is a block diagram showing the configuration of the comparison/compression circuit 101e shown in FIG. 5. FIG. 9 is a diagram showing a detailed configuration of the comparison circuit shown in FIG. 8. In FIG. 8, a start address of the drawing area of the previous display is stored in a register 351-1, and data on the size of the drawing area H×W of the previous display is stored in a register 352-1. Moreover, data on the number of vertical lines of the previous display data is stored in a buffer 353-1 for the previous display data/the number of vertical lines.

Furthermore, a start address of the drawing area of the current display is stored in a register 351-2, and data on the size of the drawing area H×W of the current display is stored in a register 352-2. Moreover, data on the number of vertical lines of the current display data is stored in a buffer 353-2 for the current display data/the number of vertical lines.

A comparison circuit 355 reads the previous display data from the memory area 107c on the basis of the start address of the drawing area of the previous display, the size of the drawing area (H×W) and the number of vertical line buffers, and also reads the current display data from the memory area 107a on the basis of the start address of the drawing area of the current display, the size of the drawing area (H×W) and the number of vertical line buffers, thereby performing comparison per data for one tile.

That is, in a comparison circuit 355 in FIG. 9(A), a pixel reading circuit 401 reads the previous display data for one tile (here, 16×16) from the memory area 107c, and also reads the current display data for one tile (here, 16×16 pixels) from the memory area 107a, on the basis of the number of vertical lines of the previous display data from the buffer 353-1 for the previous display data/the number of vertical lines, the number of vertical lines of the current display data from the buffer 353-2 for the current display data/the number of vertical lines, and the number of tiles from the register 305 for setting the number of tiles. A parallel processing circuit 402 for the number of vertical tiles×horizontal tiles uses a one-pixel subtraction circuit 402-1 to simultaneously perform the subtractions of the pixel value of the previous display data and the pixel value of the current display data for 16×16 pixels constituting one tile. In FIG. 9(A), the single one-pixel subtraction circuit 402-1 is shown and other components are omitted in the parallel processing circuit 402 for the number of vertical tiles×horizontal tiles, but the number of one-pixel subtraction circuits 402-1 provided is as many as the number of pixels to be subtracted. The pixels in question are the current display data if the result of the subtraction is not 0, while a flag is set for the pixels in question if the result of the subtraction is 0. The result of the comparison is stored in a buffer 356 for the number of vertical×horizontal lines and pixels. A flag is set in a register 404 for detecting correspondence of all pixels when all of the 16×16 pixels correspond.

When the comparison of the display data for one tile is finished, a termination judgment circuit 405 for the number of horizontal pixels judges whether the number of horizontal pixels (here, MAX 1280) finished with the processing has been reached on the basis of information from the drawing area (H×W) information register 306. If the result of the judgment is NO, this is reported to the pixel reading circuit 401 after the number of pixels (here, 16) in the horizontal direction for one tile is added in a circuit 403 for addition to the counted number of tiles in the horizontal direction. The pixel reading circuit 401 thus reads the previous display data for the next one tile from the memory area 107c, and also reads the current display data for the next one tile from the memory area 107a. The parallel processing circuit 402 for the number of vertical tiles×horizontal tiles performs the comparison processing as described above, and stores the result of the comparison in the buffer 356 for the number of vertical× horizontal lines and pixels. Data on the comparison result stored in the buffer 356 for the number of vertical×horizontal lines and pixels is compressed in a compression circuit 357. When the compression is finished, a termination judgment circuit 358 for rewrite range judges whether a rewrite range of the display data is finished on the basis of drawing area information in the drawing area information register 306. If 800 lines are not reached yet, the lines in the vertical direction are incremented in a circuit 350 for addition to the number of vertical lines so that the processing described above is performed until 800 lines are reached in the vertical direction, and the processing is finished when 800 lines are reached. Then, when the termination judgment circuit 405 for the number of horizontal pixels judges that the number of horizontal pixels has reached MAX=1280 pixels, the processing for the vertical (tile value)×horizontal buffers finishes.

FIG. 9(B) shows one example of the structure of the buffer 356 for the number of vertical×horizontal lines and pixels. In the buffer 356 for the number of vertical×horizontal lines and pixels, "Flag" is stored in a pixel in which the previous display data and the current display data are the same as a result of the comparison by the comparison circuit 355, and the current display data is stored as "current color" in a pixel in which the current display data is different from the previous display data.

Figure 10:
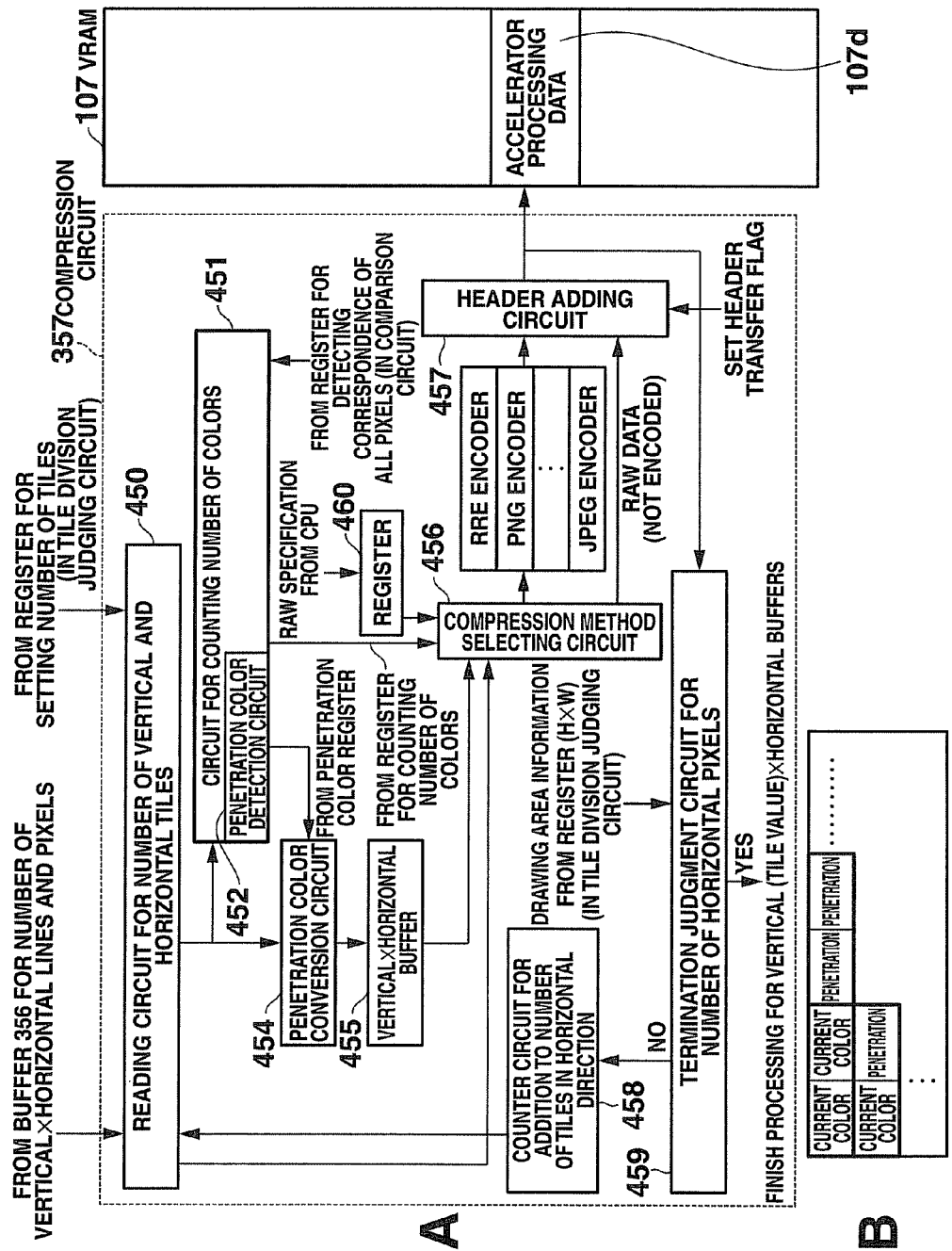
FIGS. 10A and 10B are block diagrams showing a detailed configuration of a compression circuit shown in FIG. 8.
Figure 11:
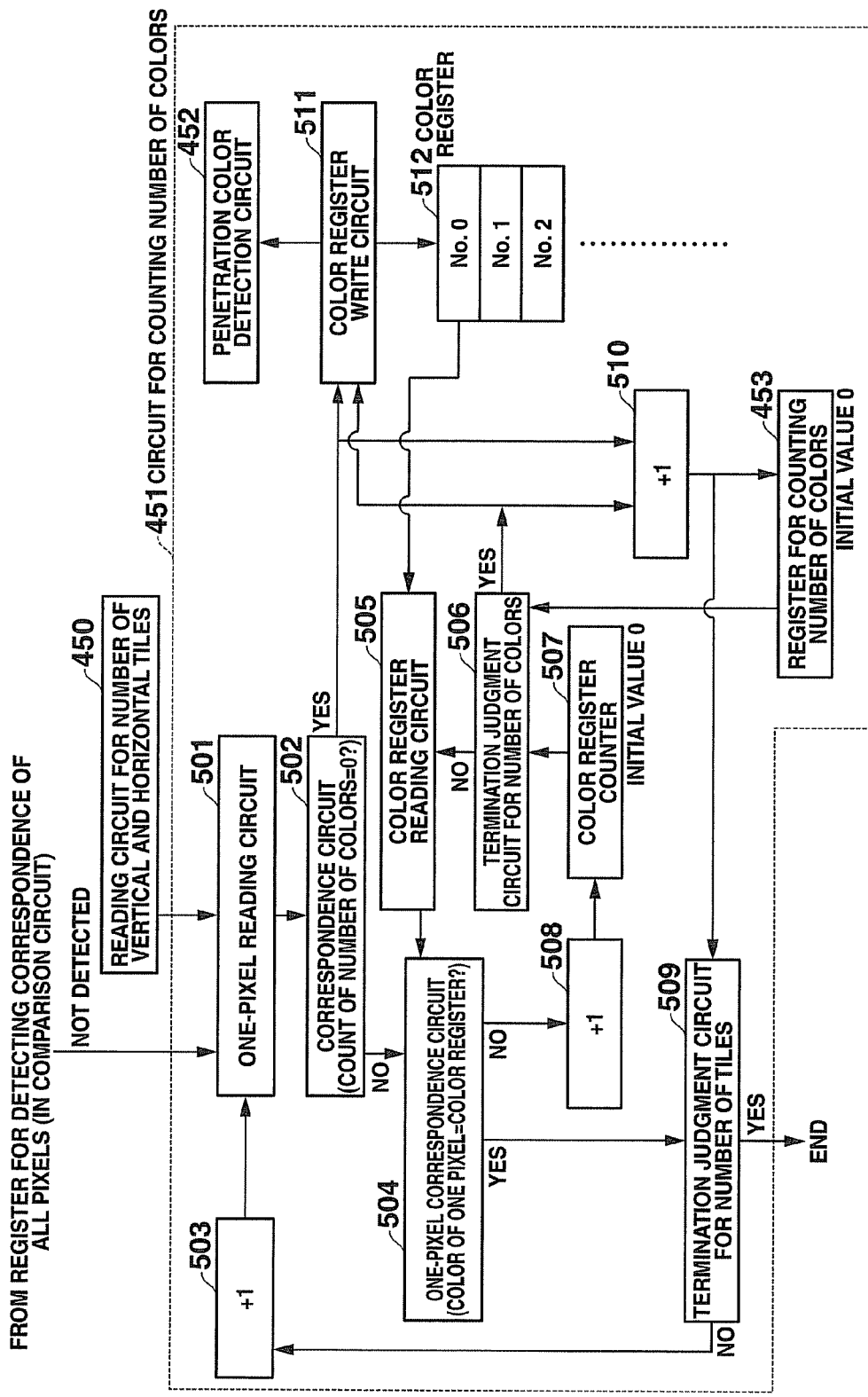
FIG. 11 is a block diagram showing a detailed configuration of a circuit 451 for counting the number of colors.

FIGS. 10(A) and (B) are block diagrams showing a detailed configuration of the compression circuit 357 shown in FIG. 8. In FIG. 10(A), a reading circuit 450 for the number of vertical and horizontal tiles reads data for one tile (here, 16×16 pixels) from the comparison result data stored in the buffer 306 for the number of vertical×horizontal lines and pixels on the basis of the number of tiles set in the register 305 for setting the number of tiles. FIG. 11 is a block diagram showing a detailed configuration of a circuit 451 for counting the number of colors. In FIG. 11, when the contents in the register 404 for detecting correspondence of all pixels indicate that there is no correspondence, a one-pixel reading circuit 501 reads data for the first one pixel from the read data for one tile. A correspondence circuit 502 judges whether the count of the number of colors equals to 0. In the initial setting, the judgment results in YES because the count is set at 0, and a color register write circuit 511 writes the color of the read one pixel at a position of No. 0 in a color register 512. At the same time, the initial value 0 is incremented via a plus-one circuit 510, so that 1 is written into a register 453 for counting the number of colors.

At this point, a termination judgment circuit 509 for the number of tiles judges whether reading for one tile has been finished. The judgment results in NO because the first one pixel is only read, and the value is incremented by one via a plus-one circuit 503. Thus, the one-pixel reading circuit 501 reads the second one-pixel data from the reading circuit 450 for the number of vertical and horizontal tiles. Since the count value of the register 453 for counting the number of colors is 1, the judgment of the correspondence circuit 502 results in NO this time. In this case, a one-pixel correspondence circuit 504 judges whether the color of the one pixel read this time corresponds to the color at the No. 0 position of the color register 512 read by a color register reading circuit 505. Here, if the judgment results in NO, the initial value 0 of a color register counter 507 is incremented via a plus-one circuit 508, so that 1 is set. Next, a termination judgment circuit 506 for the number of colors judges whether the number of colors of the color register 512 is finished. Since the color at the No. 0 position of the color register 512 has already been read, the judgment here results in YES. In this case, the color register write circuit 511 writes the color of the one pixel read this time into a position of No. 1 in the color register 512. At this point, the current count value 1 is incremented via the plus-one circuit 510, so that the count value of the register 453 for counting the number of colors is 2.

At this point, the termination judgment circuit 509 for the number of tiles judges whether reading for one tile has been finished. The judgment results in NO because the second one pixel is only read, and the value is incremented via the plus-one circuit 503. Thus, the one-pixel reading circuit 501 reads data on the third one pixel from the reading circuit 450 for the number of vertical and horizontal tiles.

At this point, because the count of the number of colors=2, the judgment of the correspondence circuit 502 results in NO. In this case, the one-pixel correspondence circuit 504 judges whether the color of the one pixel read this time corresponds to the color at the No. 0 position of the color register 512 read by the color register reading circuit 505. Here, if the judgment results in NO, the count value of the color register counter 507 is incremented via the plus-one circuit 508, so that 2 is set. Next, the termination judgment circuit 506 for the number of colors judges whether the number of colors of the color register 512 is finished. Since the color is also stored at the No. 1 position of the color register 512, the judgment here results in NO. In this case, the color register reading circuit 505 reads the color of the No. 1 position from the color register 512, and then inputs the color to the one-pixel correspondence circuit 504.

The one-pixel correspondence circuit 504 judges whether the color of the one pixel read third corresponds to the color at the No. 1 position of the color register 512 read by the color register reading circuit 505. Here, if the judgment results in NO, the count value 2 of the color register counter 507 is incremented via the plus-one circuit 508, so that 3 is set. Next, the termination judgment circuit 506 for the number of colors judges whether the number of colors of the color register 512 is finished. Since all the colors stored at the No. 0 and No. 1 positions of the color register 512 have been read, the judgment here results in YES. In this case, the color register write circuit 511 writes the color of the third one pixel into a position of No. 2 in the color register 512. At the same time, the current count value 2 is incremented via the plus-one circuit 510, so that the count value of the register 453 for counting the number of colors is 3.

At this point, the termination judgment circuit 509 for the number of tiles judges whether reading for one tile has been finished. The judgment results in NO because the third one pixel is only read, and 1 is added via the plus-one circuit 503. Thus, the one-pixel reading circuit 501 reads the fourth one-pixel data from the reading circuit 450 for the number of vertical and horizontal tiles.

In the meantime, when the judgment in the one-pixel correspondence circuit 504 becomes YES, the contents of the register 453 for counting the number of colors and the color register 512 are not changed, and the processing moves to the termination judgment circuit 509 for the number of tiles.

Thus, when the processing described above is finished after the sixteenth pixel is read by the one-pixel reading circuit 501, the judgment in the termination judgment circuit 509 for the number of tiles becomes YES, so that the processing for the data for one tile finishes. At this point, different kinds of colors are stored in the color register 512. Moreover, since a final count value of the number of colors is stored in the register 453 for counting the number of colors, it is possible to know how many kinds of colors are present in one tile.

Figure 12:
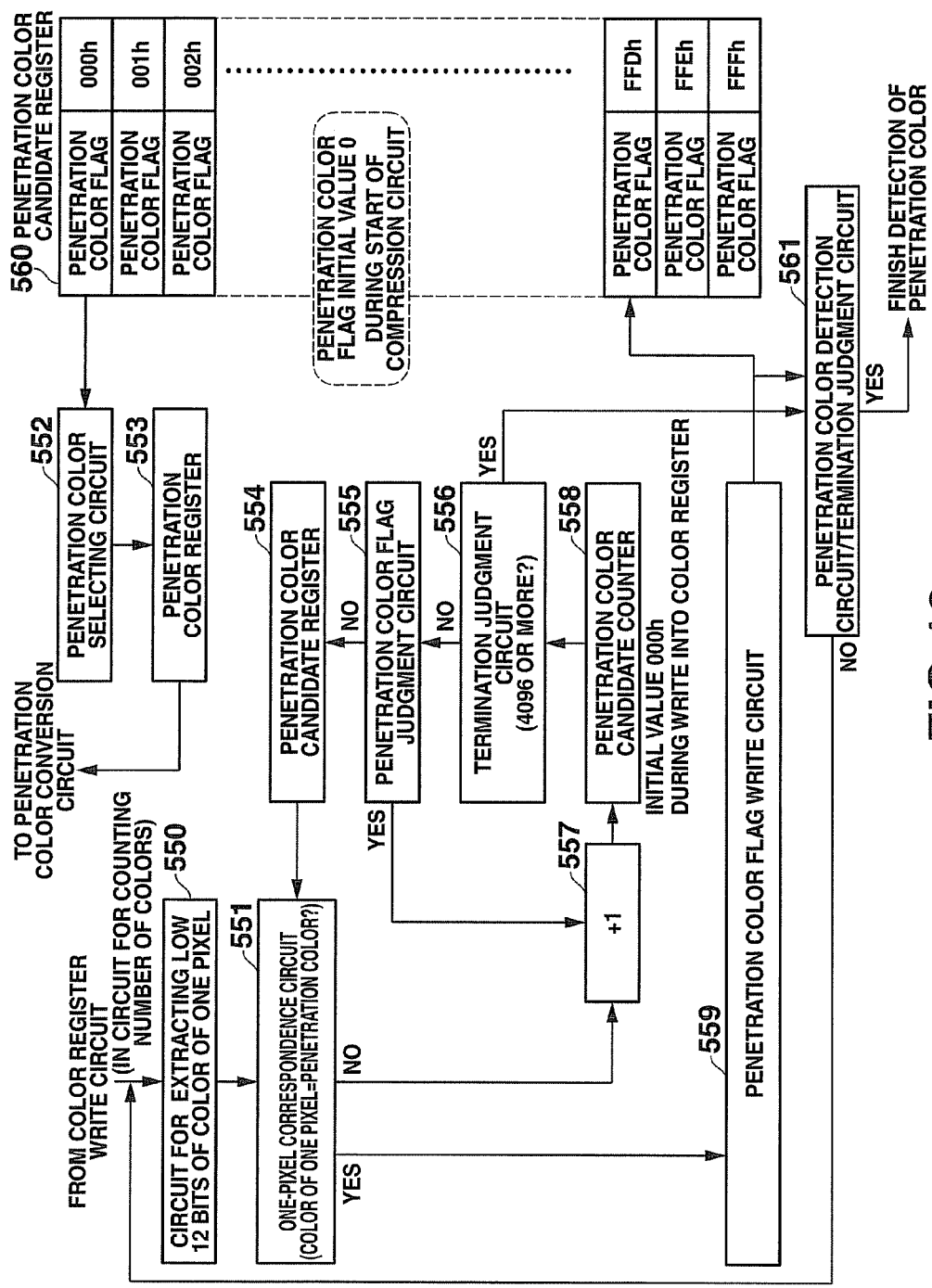
FIG. 12 is a block diagram showing a detailed configuration of a penetration color detection circuit 452.

FIG. 12 is a block diagram showing a detailed configuration of a penetration color detection circuit 452 shown in FIG. 11. In FIG. 11, it has been explained that new colors are sequentially stored in the color register 512 by the color register write circuit 511. The color register write circuit 511 also inputs the color to be newly stored to the penetration color detection circuit 452 at the same time. A circuit 550 for extracting the low 12 bits of the color of one pixel extracts the low 12 bits of the color of the one pixel.

On the other hand, for example, 4096 colors as candidates of the penetration colors are sequentially stored in a penetration color candidate register 560, in which areas for setting penetration color flags are prepared in advance to correspond to the respective colors. The penetration color flags are not written at the start of the compression circuit 357 (initial value 0). The most significant (000h) colors are selected from the penetration color candidate register 560, and set in a penetration color candidate register 553.

A one-pixel correspondence circuit 551 judges whether the color of the one pixel of the low 12 bits extracted by the circuit 550 for extracting the low 12 bits of the color of one pixel corresponds to the color set in a penetration color candidate register 554. Here, if the judgment results in NO, the count value (initial value 000h) of a penetration color candidate counter 558 is incremented via a plus-one circuit 557. Thus, the next penetration color (value 001h) is set in the penetration color candidate register 554.

Next, a termination judgment circuit 556 judges whether 4096 set in the penetration color candidate register 560 or more has been reached. Here, the judgment results in NO because the color of the first 000h is only read, and a penetration color flag judgment circuit 555 then judges whether there is a penetration color for which a flag is set. Here, the judgment results in NO because there is no such color yet. Next, the one-pixel correspondence circuit 551 judges whether the color of the already extracted one pixel corresponds to the penetration color (001h) set in the penetration color candidate register 554. Here, if the judgment results in NO, the penetration color candidate counter 558 is incremented by one, so that the next penetration color (002h) is set in the penetration color candidate register 554. Then, the pixel correspondence circuit 551 judges whether the color of the already extracted one pixel corresponds to the penetration color (002h) set in the penetration color candidate register 554. Here, if the judgment results in YES, a penetration color flag write circuit 559 sets a penetration color flag for the current penetration color (002h). At the same time, a penetration color detection circuit/termination judgment circuit 561 judges whether the judgment of the penetration colors has been finished for all the pixels to be written by the color register write circuit 511. Here, the judgment results in NO because the first pixel has only been judged, and the low 12 bits of the next color to be written by the color register write circuit 511 are extracted.

On the other hand, the most significant color (000h) for which a flag has not been set yet is set in the penetration color candidate register 554. The one-pixel correspondence circuit 551 judges whether the color of the next one pixel corresponds to the candidate color set in the penetration color candidate register 554. Subsequently, the processing is performed in the procedure described above, and there is already a penetration color (0002h) for which a flag is set at this point. This is detected by the penetration color flag judgment circuit 555. In this case, the count value of the penetration color candidate counter 558 is incremented via the plus-one circuit 557. Thus, the candidate color (0002h) for which the flag is set is skipped over to set a next candidate color in the penetration color candidate register 554, so that it is judged whether this candidate color corresponds to the color of the next one pixel.

Thus, the one-pixel correspondence circuit 551 compares all the colors written by the color register write circuit 511 with the candidate colors in the penetration color candidate register 560 in descending order of ranks, and then judges whether they correspond to each other. Flags are set for the candidate colors that correspond.

A penetration color selecting circuit 552 selects the high candidate color for which a flag is not set (which is not used), and sets this color in the penetration color register 553. At this point, the judgment in the penetration color detection circuit/termination judgment circuit 561 becomes YES, and the processing finishes.

Returning to FIG. 10, the contents of the penetration color candidate register 560 are input to the penetration color conversion circuit 454. The penetration color conversion circuit 454 refers to the contents of the penetration color candidate register 560 to perform conversion processing of replacing, with a penetration color, an unused color out of the color data for one tile read by the reading circuit 450 for the number of vertical and horizontal tiles. The result is stored in a vertical× horizontal buffer 455. FIG. 10(B) is a diagram showing one example of display data stored in the buffer 455. In the vertical×horizontal buffer 455, the penetration colors converted by the penetration color conversion circuit 454 are stored as "penetration", and other current display data are stored as "current color".

The display data in the vertical×horizontal buffer 455 is input to a compression method selecting circuit 456. Further, the compression method selecting circuit 456 receives the value of the number of colors of the register 453 for counting the number of colors. Moreover, when a RAW specification is set by the CPU 102 as described later, this is set in a register 460, so that data therein is also input to the compression method selecting circuit 456.

The compression method selecting circuit 456 has a table for deciding a compression method as shown in FIG. 13, and the selecting circuit 456 refers to such a table to select an encoding method corresponding to the value of the number of colors of the register 453 for counting the number of colors. For example, a rise and run length encoding (RRE) method is selected if the number of colors is one or two, or a PNG method is selected if the number of colors is three or more and less than 128, or a JPEG encoding method is selected if the number of colors is 128 or more. In addition, the encoding processing is not performed when the RAW specification is set, for example, when a decryption function is not provided on the side of the client apparatus 20.

Thus, the selection of the encoding method corresponding to the value of the number of colors makes it possible to increase the efficiency of compression. Here, 128 colors used as a judgment standard are not fixed, and can be changed in accordance with the size of one tile to reduce the amount of data. For example, 256 colors or more are used if the size of the tile is 32×32, or 512 colors or more are used if the size of the tile is 64×64.

In addition, since the Joint Photographic Experts Group (JPEG) encoder method is a nonreversible compression mode, the display data read by the reading circuit 450 for the number of vertical and horizontal tiles is input to an encoder, rather than the display data (FIG. 10(B)) obtained by the conversion processing in the penetration color conversion circuit 454. Moreover, when a compression method is specified by the client apparatus 20, the specified compression method may be used.

Next, in accordance with the encoding method selected with reference to a table for result data and header formats as shown in FIG. 14, a header adding circuit 457 adds to the data a header including information such as a serial number, positional information, a height and width, encode information, the penetration colors, a data length, and a transfer flag (transfer or not). The header adding circuit 457 then stores the data as accelerator processing data into the memory area 107d on the VRAM 107.

At this point, a termination judgment circuit 459 for the number of horizontal pixels judges whether the maximum number (here, 1280) of pixels in the horizontal direction has been reached. If the judgment results in NO, an increment for one tile (16 pixels) is given in the horizontal direction via a counter circuit 458 for addition to the number of tiles in the horizontal direction. Thus, the reading circuit 450 for the number of vertical and horizontal tiles reads data for the next one tile. Subsequently, the processing is performed in the procedure described above. Then, when the termination judgment circuit 459 for the number of horizontal pixels judges that the maximum number (here, 1280) of pixels in the horizontal direction has been reached, the processing for the vertical (tile value)×horizontal buffers finishes.

After this processing, a return is made to FIG. 8, and, as described above, if the compression processing in the compression circuit 357 described above is finished, the termination judgment circuit 358 for rewrite range judges whether a rewrite range of the display data is finished on the basis of drawing area information in the drawing area information register 306. If 800 lines are not reached yet, the lines in the vertical direction are incremented in the circuit 350 for addition to the number of vertical lines so that the processing described above is performed until 800 lines are reached in the vertical direction, and the processing is finished when 800 lines are reached.

Figure 15:
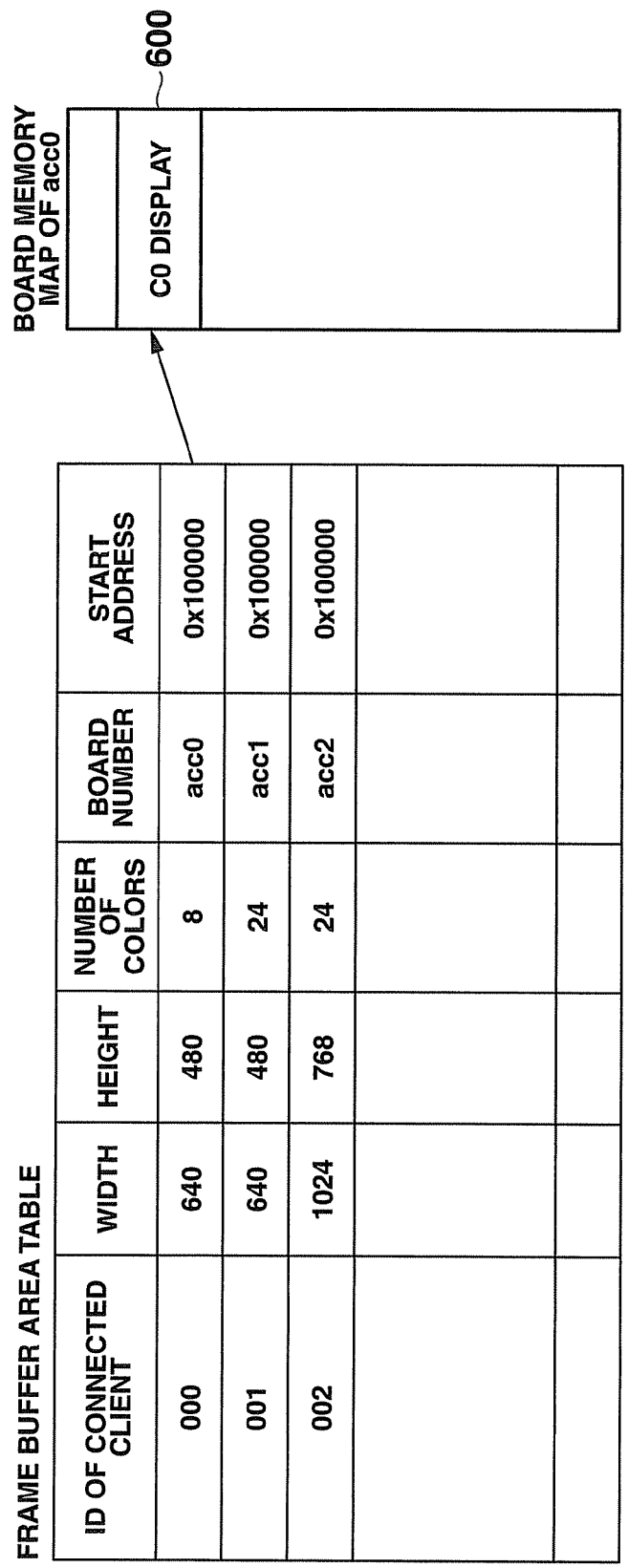
FIG. 15 is a diagram showing one example of the contents of a frame buffer area table.

FIG. 15 is a diagram showing the configuration of a frame buffer area table on the VRAM 107. This table stores, for each client apparatus 20 to be connected (whose IDs are, for example, 000, 001, 002), a required size of the drawing area (height (H)×width (W)), the number of colors, a board number, and a drawing start address on the VRAM 107. A memory area corresponding to the calculated area for each client apparatus 20 is secured. FIG. 15 shows how a memory area 600 corresponding to the drawing area is secured on the VRAM 107 of the accelerator circuit 101 corresponding to a board number acc0.

Figure 16:
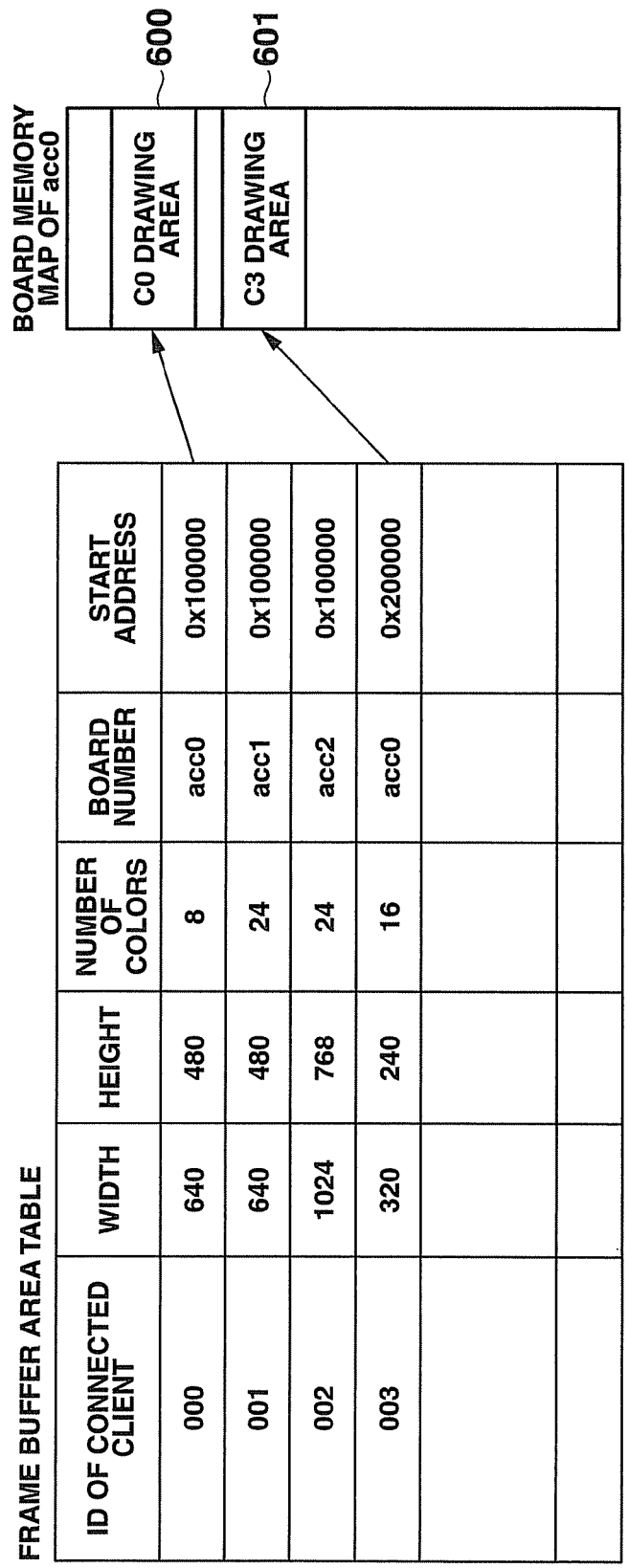
FIG. 16 is a diagram showing how board numbers for new client apparatuses are allocated in the table of FIG. 15.

Here, when a display request is made from a new client apparatus 20 (client ID 003), the CPU 102 as drawing area calculating means calculates the size of the drawing area for each accelerator (here, board numbers acc0, acc1 and acc2). Then, the CPU 102 as allocation means selects the accelerator circuit 101 of the board number (here, acc0) having the smallest drawing area or a smaller drawing area among the calculated drawing areas and allocates this accelerator circuit 101, as shown in FIG. 16. Then, a memory area 601 corresponding to the drawing area of the client ID 003 is secured on the VRAM 107 of the accelerator circuit 101.

Figure 17:
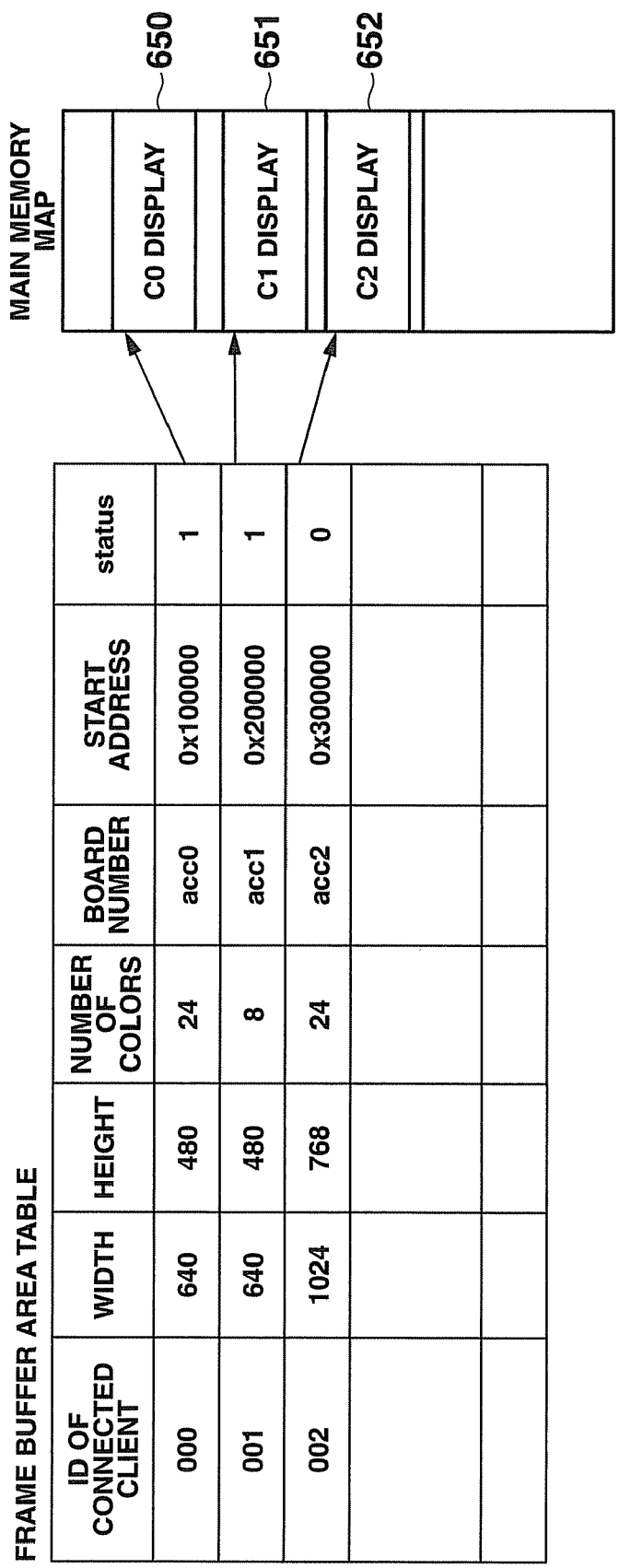
FIG. 17 is a diagram showing another example of the contents of the frame buffer area table.

FIG. 17 shows a modification of the frame buffer area table. This table stores, for each client apparatus 20 to be connected (whose IDs are, for example, 000, 001, 002), a required size of the drawing area (height (H)×width (W)), the number of colors, a board number, a drawing start address on the RAM 105, and status information indicating how each accelerator circuit is used. Memory areas 650, 651 and 652 corresponding to the drawing areas calculated for the respective client apparatuses 20 are secured on the RAM 105.

Figure 18:
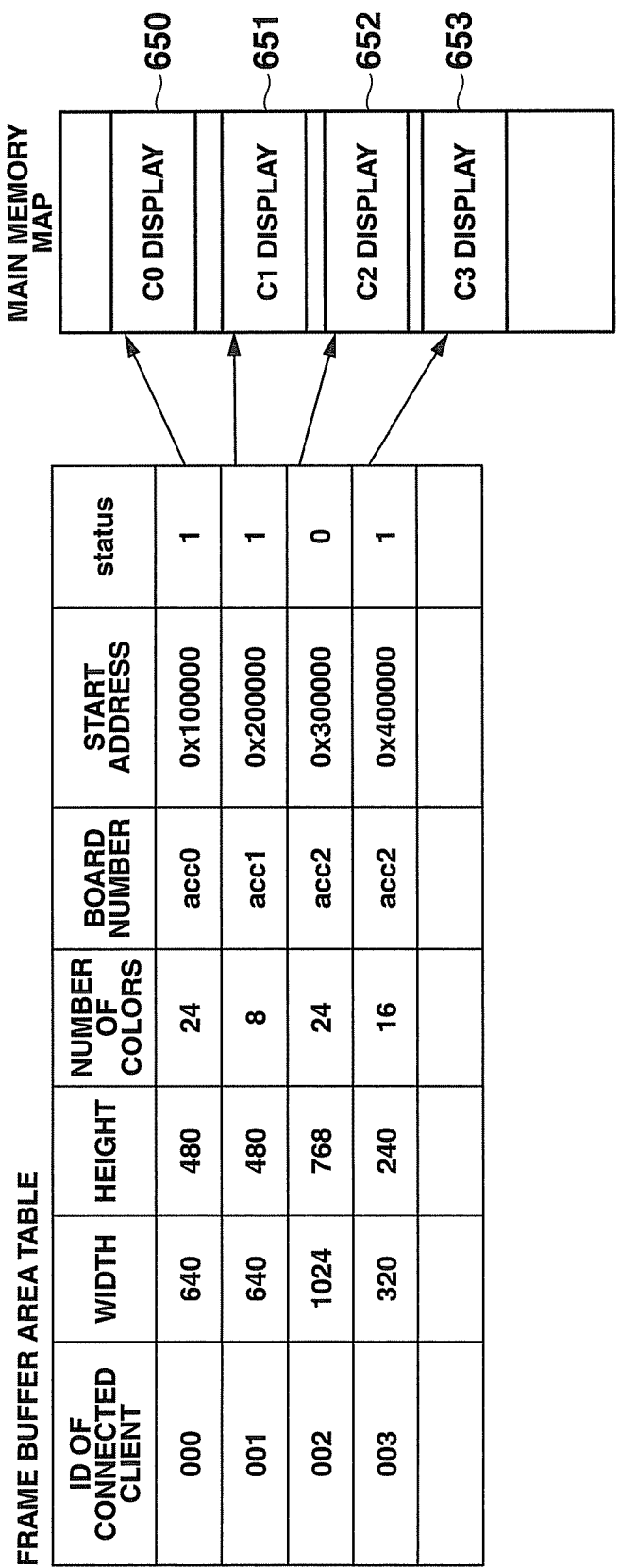
FIG. 18 is a diagram showing how board numbers for the new client apparatuses are allocated in the table of FIG. 17.

Here, when a display request is made from a new client apparatus 20 (client ID 003), the CPU 102 as the drawing area calculating means detects the use of each of the accelerators (here, board numbers acc0, acc1 and acc2). Then, the CPU 102 as the allocation means selects the accelerator circuit 101 of the board number (here, acc2 having a status 0) which is most frequently used among the board numbers acc0, acc1 and acc2, and allocates this accelerator circuit 101, as shown in FIG. 18. Then, a memory area 653 corresponding to the drawing area of the client ID 003 is secured on the RAM 105.

It is to be noted that the drawing areas or the number of colors may be compared to select the accelerator having the lowest board number when the use (status) of the accelerators of the respective board numbers in the table is the same.

Figure 19:
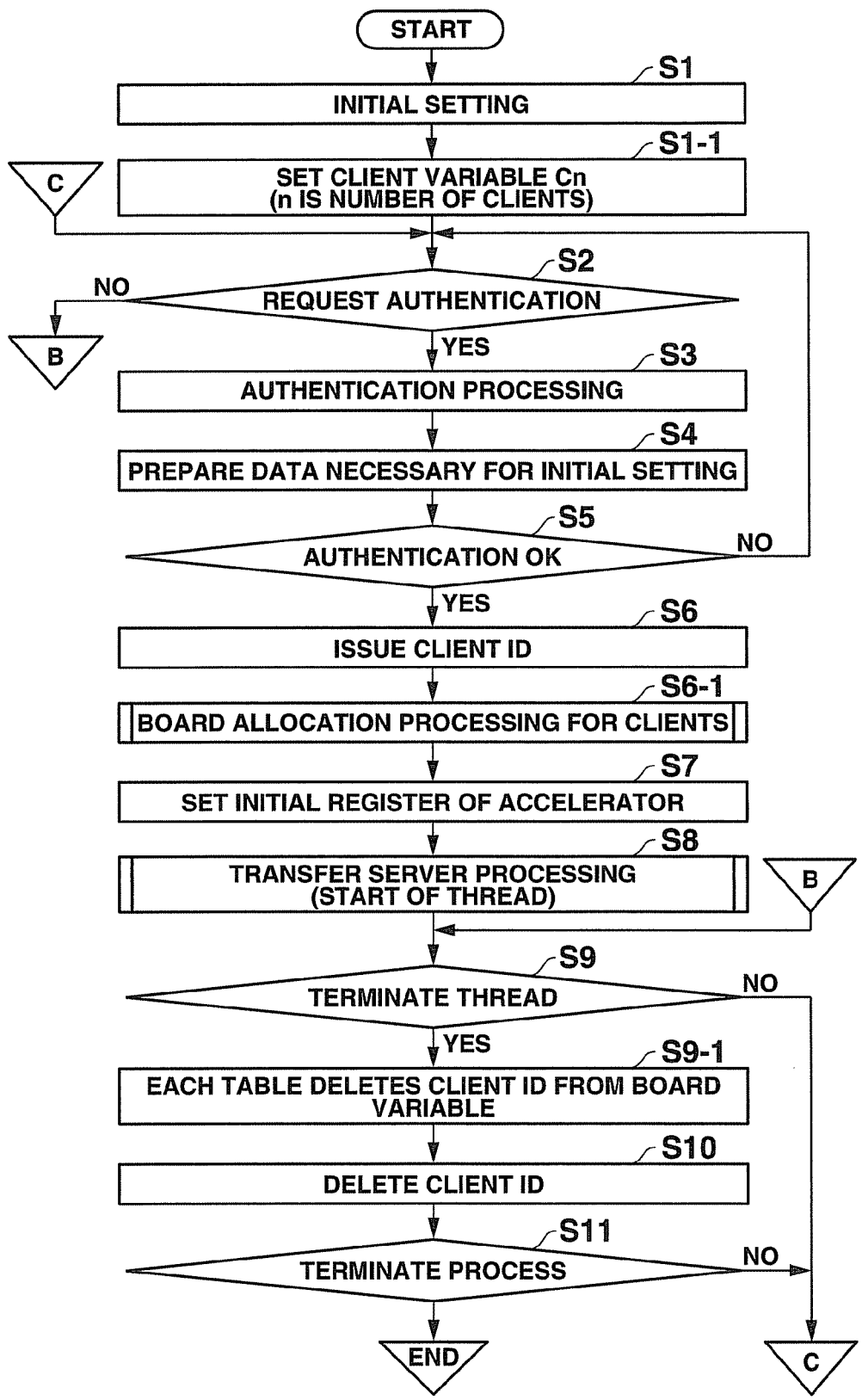
FIG. 19 is a diagram for explaining a procedure of a server processing flow executed by a CPU 102 of the server apparatus 10 using software.

FIG. 19 is a diagram for explaining a procedure of a server processing flow executed by the CPU 102 of the server apparatus 10 using software. First, the server apparatus 10 performs initial setting (step S1), and sets a client variable Cn for each client apparatus 20 to be connected (step S1-1). Then, it is judged whether there is a request for authentication from the client apparatus 20 (step S2). The transition is made to step S9 if the judgment here results in NO, or authentication processing (step S3) is performed if YES. Subsequently, data for initial setting is prepared (step S4). To be specific, there are generated initial setting data on the display area H/W, the number of colors, a scale, whether there is a designation of compression, whether to encrypt, etc.

Next, whether the client apparatus 20 is acceptable is judged by the authentication. A return is made to FIG. 2 if the judgment results in NO, or a predetermined ID is issued to the client apparatus 20 if YES (step S6). Then, board allocation (accelerator allocation) processing for each client apparatus 20 is performed (step S6-1). Details of this processing will be described later. Then, various kinds of data generated in step S4 are set in the initial setting register 101b within the accelerator circuit 101 (step S7). To be specific, for each client Cn to be connected, there are set its display structure (the height H×width W of one screen), the number of colors, the designation of the memory area 107a on the VRAM 107 for storing the current display data, the designation of the memory area 107c on the VRAM 107 for storing the previous display data, the designation of the memory area 107b on the VRAM 107 for storing the scaled display data, the designation of the memory area 107d on the VRAM 107 for storing accelerator processing data, the number of bytes, and whether to implement encryption (on/off).

Next, a thread is started to perform transfer server processing (step S8). Details of the processing here will be described later. The thread is a program for transmitting/receiving data to/from the client apparatus, and started for each client.

Next, the transition is made to step S9 to judge whether to finish the presently operating thread. If the judgment results in NO, a return is made to step S2 to wait until a request for authentication is made from the next client apparatus 20. Moreover, if the judgment in step S9 results in YES, the ID of the client apparatus issued in step S6 is deleted (step S10). Then, whether to finish the present server processing is confirmed (step S11). If the result is NO, a return is made to step S2 to wait until a request for authentication is made from the next client apparatus 20. If the judgment in step 11 results in YES, the present server processing is finished.

Figure 20:
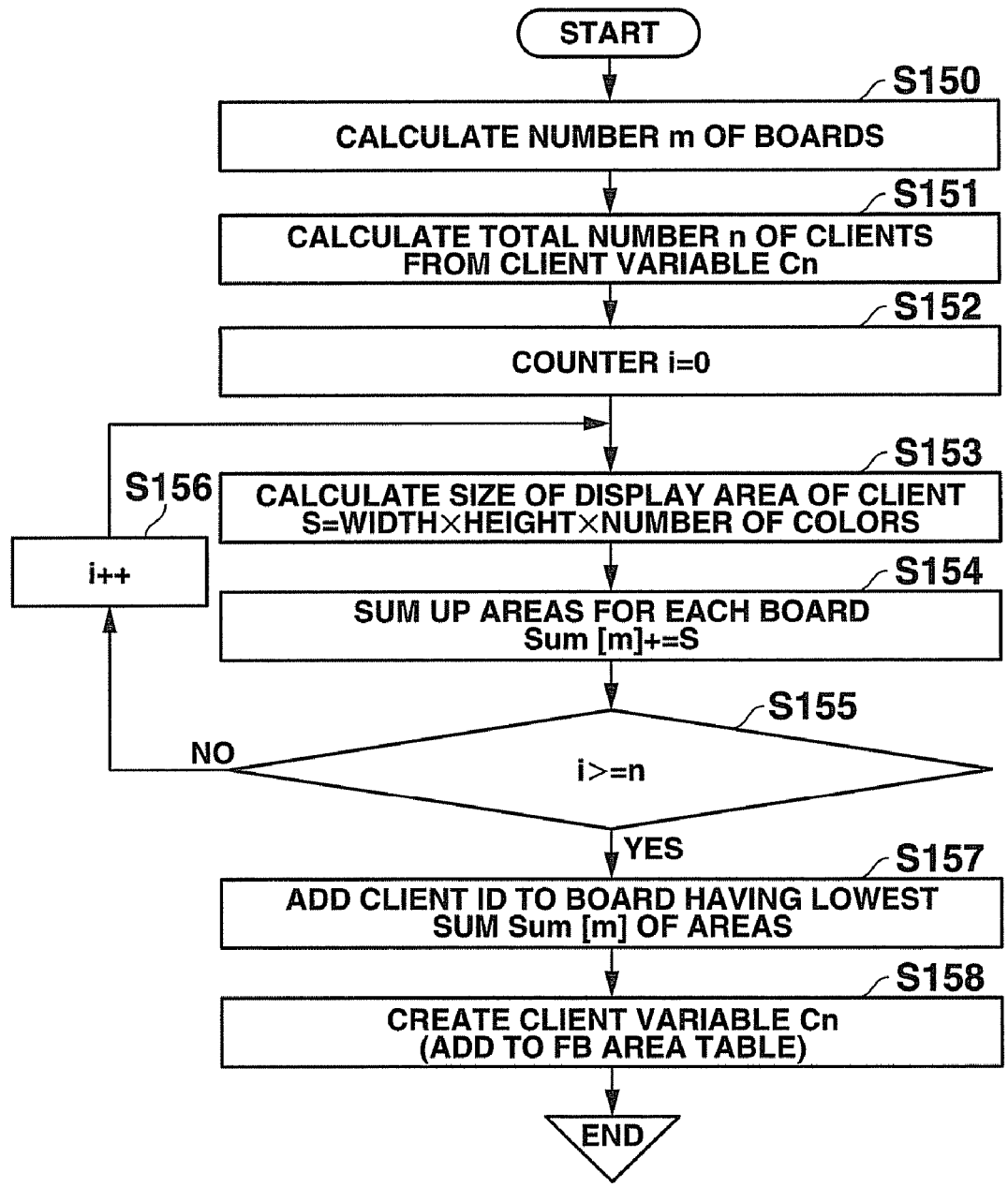
FIG. 20 is a flowchart showing details of a board allocation processing flow of FIG. 19.

FIG. 20 is a flowchart showing details of the board allocation processing (step S6-1) for the clients in FIG. 19. First, the CPU 102 in the server apparatus 10 calculates the number of boards (accelerator circuits 101) (step S150). Then, the CPU 102 calculates a total number n of client apparatuses 20 from the initially set client variable Cn (step S151). Then, 0 is substituted for a counter variable i (step S152). Subsequently, a size S of the drawing area of each client apparatus 20 is calculated (step S153). Here, the value of S=H (height)×W (width)×the number of colors is calculated. In addition, the value of H (height)×W (width) or the value of the number of colors alone may be the size S of the drawing area.

Next, a sum Sum [m] of the sizes of the drawing areas is found for each board (accelerator circuit 101) (step S154). When one client apparatus 20 is allocated to one accelerator circuit 101, the drawing area of this client apparatus 20 is the sum Sum [m] to be found. However, when a plurality of client apparatuses 20 are allocated to one accelerator circuit 101, the sum Sum [m] of the drawing areas of these client apparatuses 20 is the size of the drawing area to be found. The processing in steps S153 and S154 is performed until the total number n of clients is reached (steps S155 and S156). When the total number n of clients is reached, a new client ID is added to the board (accelerator circuits 101) having the lowest value among the sums SUM [m] counted for the respective boards (accelerator circuits 101) (step S157). Next, a client variable Cn is newly created, and information on the new client is added to the frame buffer area table as shown in FIG. 16 (step S158), and then the processing is finished.

Figure 21:
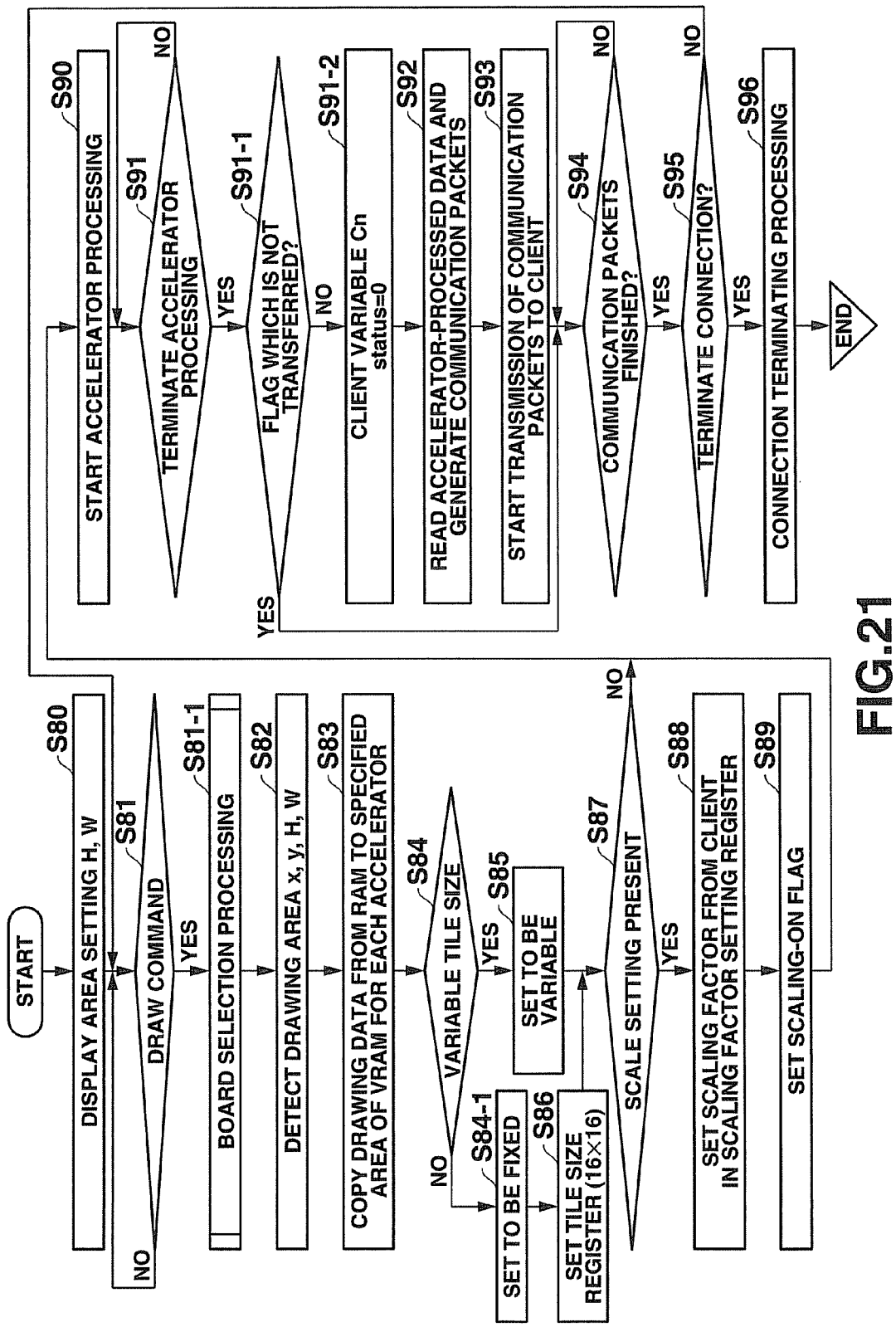
FIG. 21 is a flowchart showing details of the transfer server processing of FIG. 19.

FIG. 21 is a flowchart for explaining a procedure of the transfer server processing of FIG. 19. The CPU 102 in the server apparatus 10 first secures, on the RAM 105, a display area (H×W) for writing data for one screen (step S80). Then, the CPU 102 judges whether data has been written into the display area in accordance with a draw command from the application program working on the server apparatus 10 (step S81). If the judgment results in YES, board selection processing for selecting a board (accelerator circuits 101) for the new client 20 is performed (step S81-1). This board selection processing will be described later.

Next, the size (H×W) of the drawing area into which data has been written, and a coordinate position x, y are detected (step S82). Then, the display data written in the display area on the RAM 105 is copied into the memory area 107a on the VRAM 107. This serves as the current display data shown in FIG. 5.

Next, it is judged whether a variable tile size is set (step S84). If the judgment results in YES, the division method selection register 301 (FIG. 7) in the tile division judging circuit 101d is set to be variable (step S85). If the judgment results in NO, the division method selection register 301 (FIG. 7) is set to be fixed (step S84-1). Then, when the division method selection register 301 is set to be fixed, the register 302 for specifying the number of divisions is set to, for example, 16×16 (step S86). Then, it is judged whether there is a scale setting request from the client apparatus 20 (step S87). If the judgment results in NO, the transition is made to step S90 described later. If the judgment results in YES, the scaling factor from the client apparatus 20 is set in the scaling factor setting register 202 (FIG. 6) (step S88). Then, a scaling-on flag is set in the scaling on/off register 201 (FIG. 6) (step S89).

After the processing described above is finished, the processing in the accelerator circuit 101 is started (step S90). That is, a command to start the processing is sent to the scaling circuit 101c (FIG. 5) and the tile division judging circuit 101d (FIG. 5) from the CPU 102 (FIG. 4). Then, the CPU 102 waits until the processing in the accelerator circuit 101 is finished (step S91), and if the processing is finished, the CPU 102 judges whether the transfer flag is set to "not transferred" (step S91-1). If the judgment results in YES, the transition is made to step S94. If the judgment results in NO, the status of the client variable Cn is set to 0 (step S91-2), and then the transition is made to step S92.

In step S92, the accelerator processing data stored in the memory area 107d on the VRAM 107 is read to generate communication packets containing the drawing data displayed on the client apparatus 20. When encryption processing has been performed in the encryption circuit 101f, the encrypted data stored in the memory area 107e is read to generate communication packets.

Next, the transmission of the communication packets to the client apparatus 20 is started (step S93). Then, the transmission of all the communication packets is confirmed (step S94). When the transmission is confirmed, it is judged whether the client apparatus 20 has informed of the termination of the connection (step S95). When the judgment results in NO, a return is made to step 81, and the subsequent processing is continued. When the judgment in step S95 results in YES, connection terminating processing (step S96) is carried out to finish the communication with the client apparatus 20.

Figure 22:
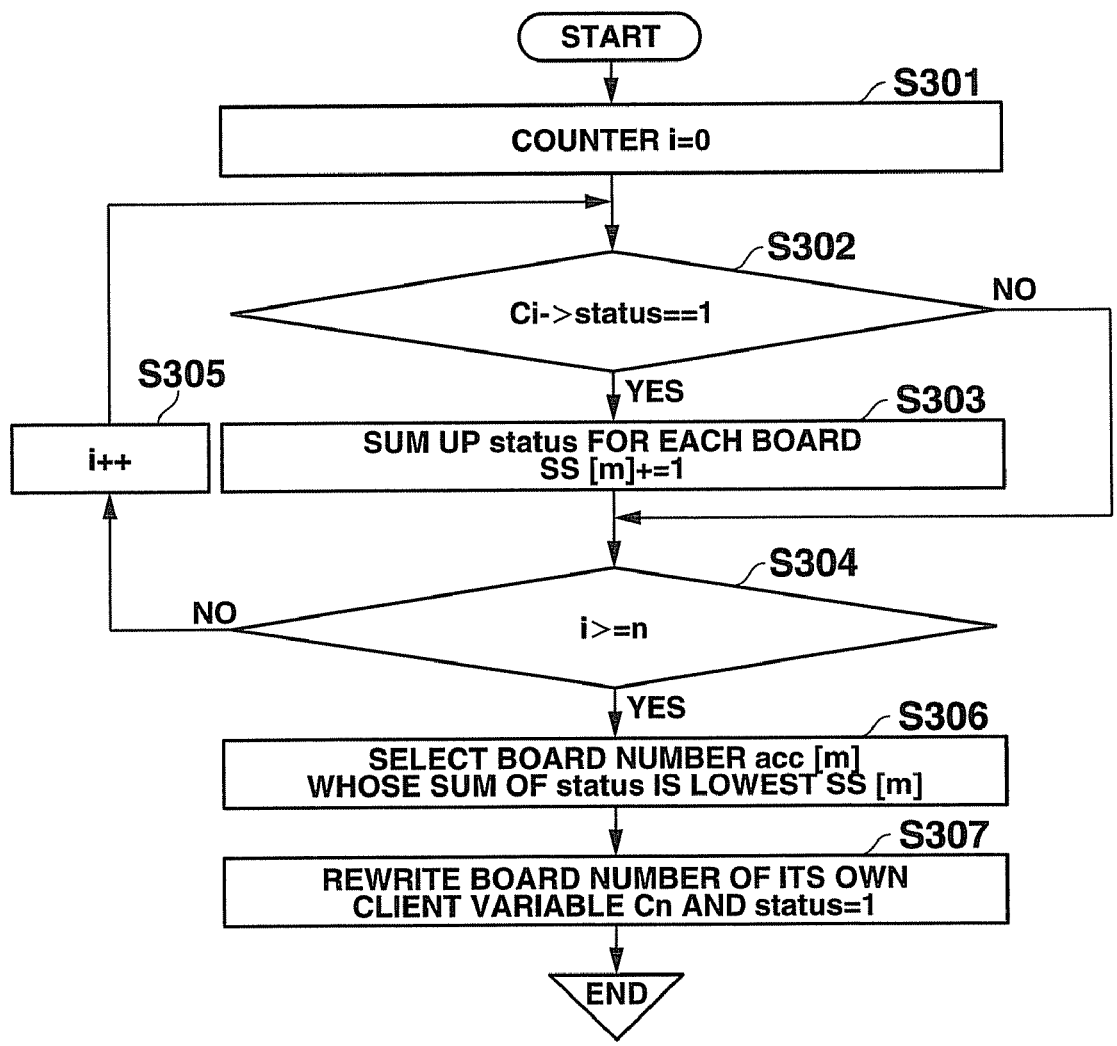
FIG. 22 is a flowchart showing details of board selection processing of FIG. 21.

FIG. 22 is a flowchart showing details of the board selection processing (step S81-1) of FIG. 21. First, 0 is substituted for the counter variable i (step S301). Then, with reference to the frame buffer area table in FIG. 18, it is judged whether the status information is 1 for each of the IDs of the connected client (step S302). If the judgment in results in YES here, a sum SS [m] of the sizes of the drawing areas is found for each board (accelerator circuit 101) (step S303). When one client apparatus 20 is allocated to one accelerator circuit 101, the drawing area of this client apparatus 20 is the sum SS [m] to be found. However, when a plurality of client apparatuses 20 are allocated to one accelerator circuit 101, the sum SS [m] of the drawing areas of these client apparatuses 20 is the size of the drawing area to be found. The processing in steps S302 and S303 is performed until the total number n of clients is reached (steps S304 and S305). When the total number n of clients is reached, the board number (accelerator 101) acc [m] having the lowest value among the sums SS [m] counted for the respective boards (accelerator circuits 101) is selected (step S306). Next, the client ID is added to the selected board to set the status to 1 (step S307).

Figure 23:
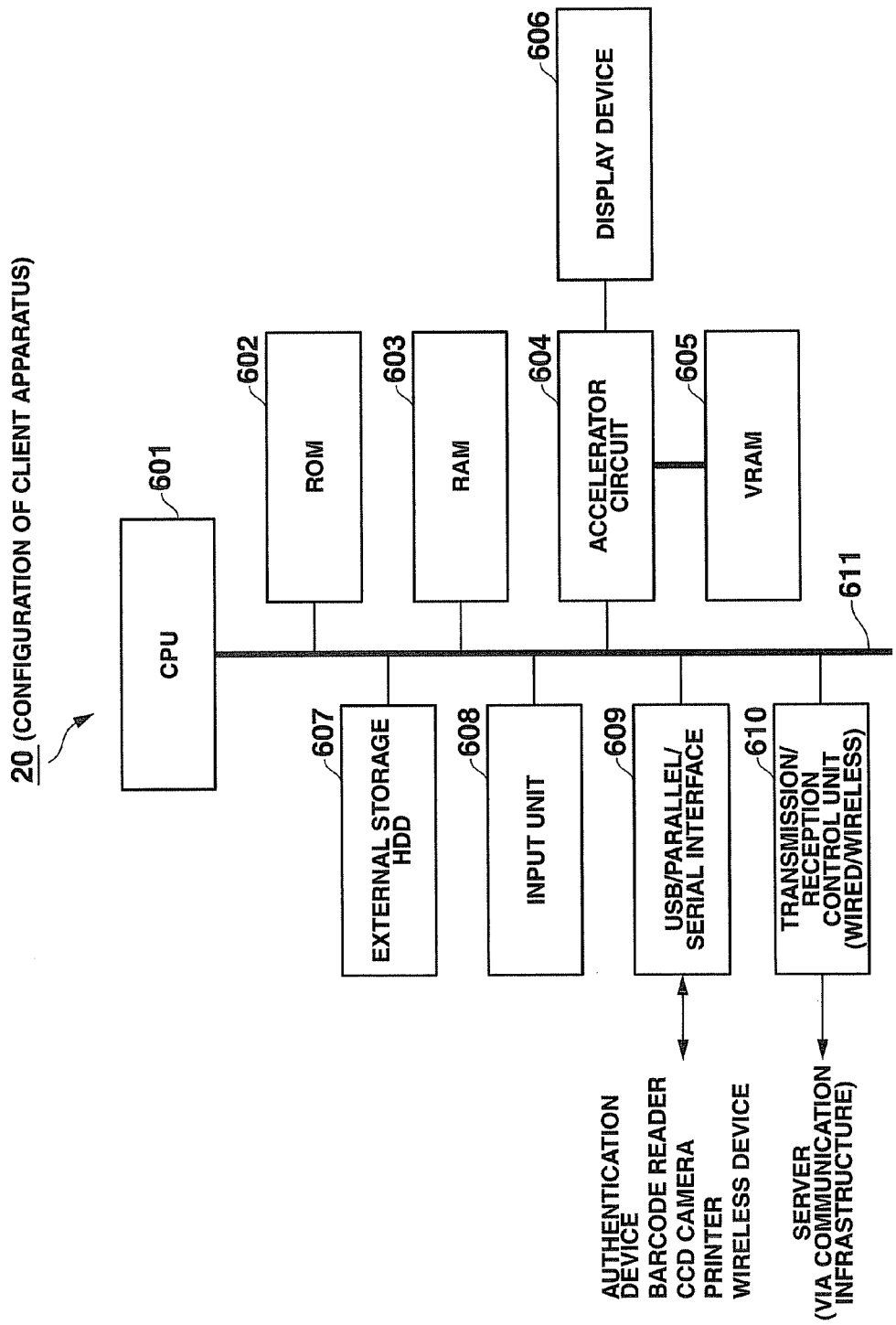
FIG. 23 is a block diagram showing a circuit configuration of the client apparatus 20 in the present computer system.

FIG. 23 is a block diagram showing a circuit configuration of the client apparatus 20 in the present computer system. The client apparatus 20 comprises a CPU 601 as a computer to which a ROM 602 and a RAM 603 are connected via a bus 611 and an accelerator circuit 604 is also connected. A VRAM 605 is mounted on this accelerator circuit 604. The drawing data written in the VRAM 605 is output to/displayed on a display device 606.

Furthermore, to the CPU 601, there are connected, via the bus 611, an input unit 608 such as a keyboard, an external storage hard disk drive (HDD) 607, a USB/parallel/serial interface 609 for connecting various external devices such as an authentication device, a bar code reader, a CCD camera, a printer and a wireless device, and a transmission/reception control unit (wired/wireless) 610 for controlling the transmission/reception of data to/from the server apparatus 10.

The CPU 601 controls the operation of the components of the circuits using the RAM 603 as a work memory in accordance with a system program stored in the ROM 602 in advance. This system program is started and executed in response to a key input signal from the input unit 608, an application reply signal from the server apparatus 10 received via the transmission/reception control unit 610, or transferred drawing data.

In this client apparatus 20, various kinds of data generated by executing the application program in the server apparatus 10 are suitably read and stored in the external storage (HDD) 607, and the display drawing data which has been generated and transferred is decoded in the accelerator circuit 604, written into the VRAM 605, and displayed/output on the display device 606.

Figure 24:
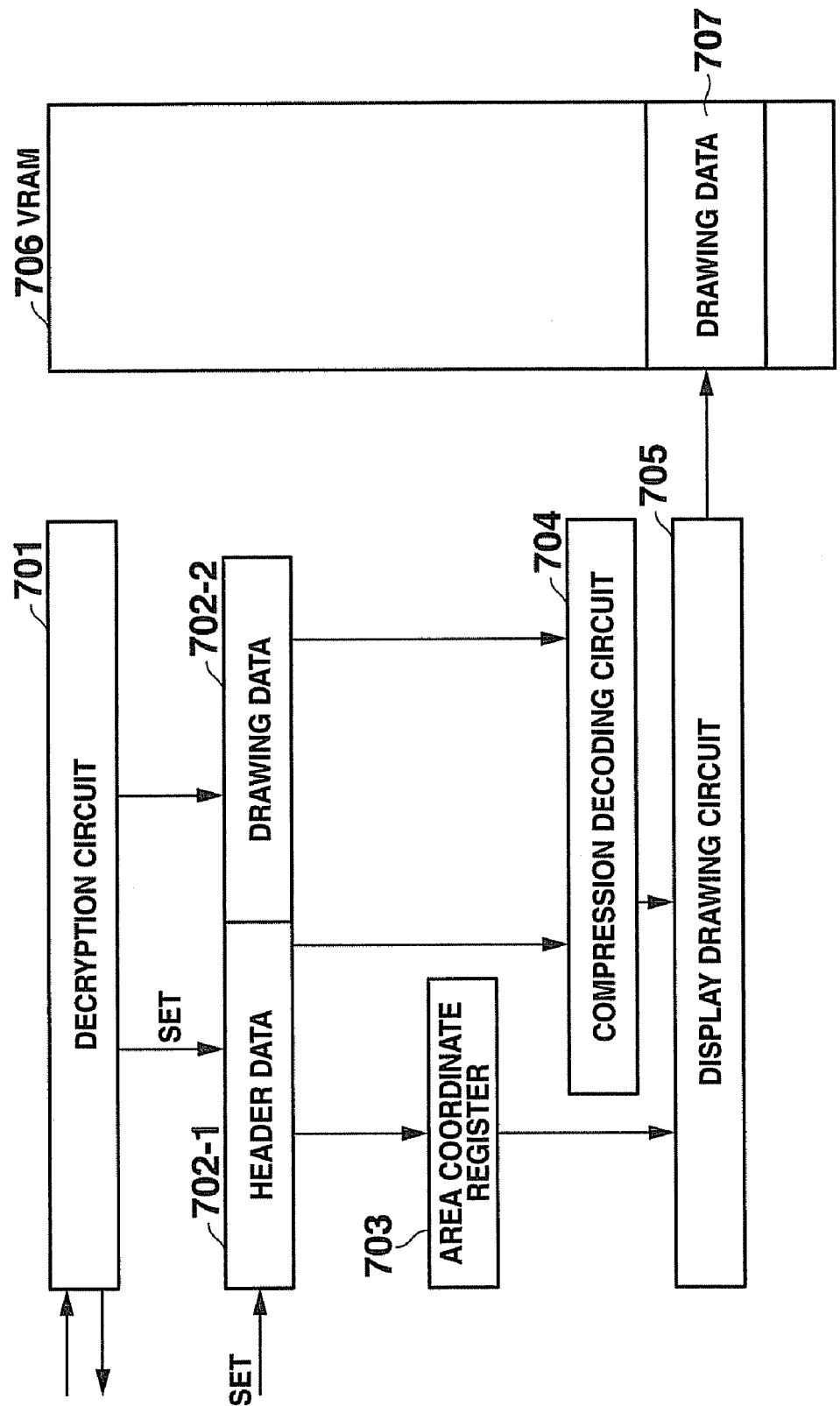
FIG. 24 is a diagram showing a detailed configuration of an accelerator circuit 604 shown in FIG. 23.

FIG. 24 is a diagram showing a detailed configuration of the accelerator circuit 604 shown in FIG. 23. A decryption circuit 701 decrypts a compressed/encrypted data file for one tile sent from the server apparatus 10. The decrypted data file is set as header data 702-1 and drawing data 702-2. A compression decoding circuit 704 decodes the drawing data by an extension method corresponding to the compression mode written in the header data 702-1. The decoded drawing data is drawn in a memory area 707 on a VRAM 706 on the basis of the size H×W and X, Y coordinates of the drawing data set in an area coordinate register 703.

Figure 25:
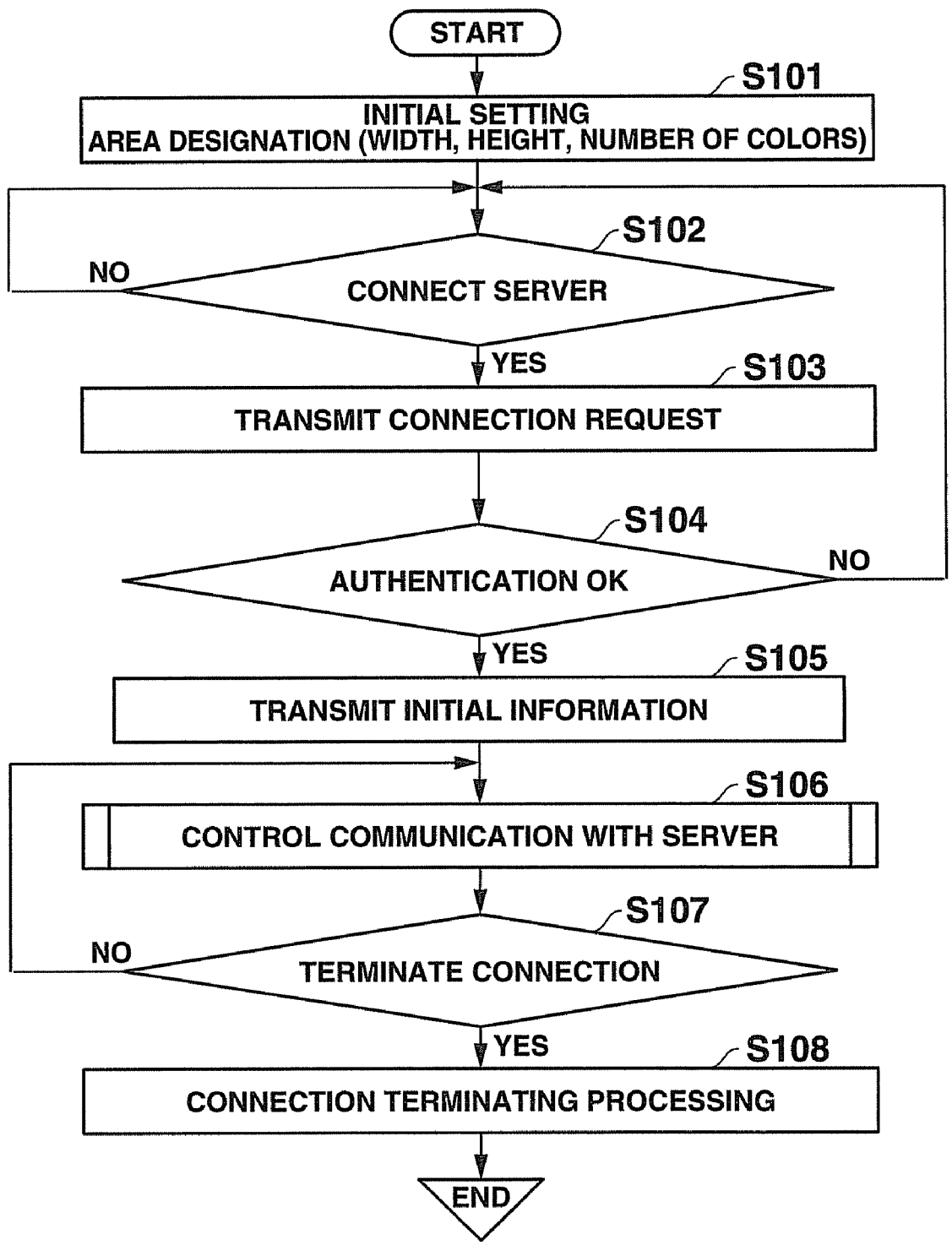
FIG. 25 is a flowchart showing a processing procedure in the client apparatus 20.

FIG. 25 is a flowchart showing a processing procedure in the client apparatus 20. First, initial setting is carried out (step S101). Here, the size of H×W (height×width) and the number of colors are set as a display structure. Then, whether to connect with the server apparatus 10 is judged (step S102). If the judgment results in NO, the procedure is put on standby until the judgment results in YES. When the judgment results in YES, a connection request is transmitted to the server apparatus 10 (step S103). In response to this request, the server apparatus 10 judges whether the connection from the client apparatus 20 is valid, while the client apparatus 20 waits until the acceptance in the authentication is reported from the server apparatus 10 (step S104). When the acceptance in the authentication is reported, the client apparatus 20 transmits the initial information set in step S101 to the server apparatus 10 (step S105). Then, while the client apparatus 20 communicates with the server apparatus 10, this communication with the server apparatus 10 is controlled (step S106). When this communication terminates, whether to terminate the connection is confirmed (step S107). If the confirmation results in YES, connection terminating processing (step S108) is carried out to finish the connection processing.

Figure 26:
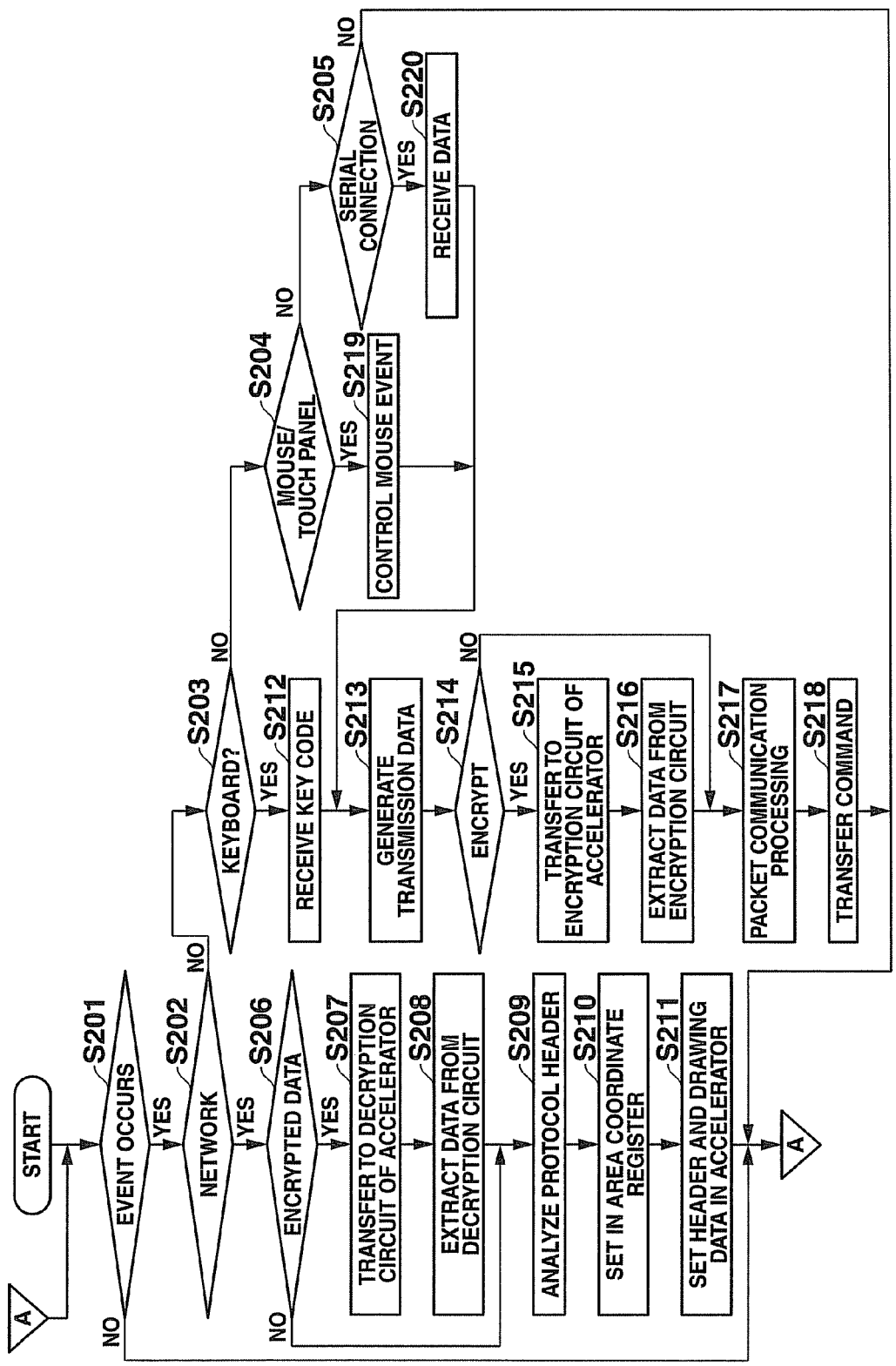
FIG. 26 is a flowchart showing details of control of a communication with the server.

FIG. 26 is a flowchart showing details of the control of the communication with the server. First, the operation is put on standby until any event occurs by the operation of the keyboard or mouse (step S201). If an event occurs, it is judged whether this event is the reception of the data from the server apparatus 10 via the network (step S202). If the judgment results in NO, it is judged whether this event is the operation of the keyboard (step S203). Here, if the judgment results in NO, it is judged whether this event is the operation of the mouse or touch panel (step S204). If the judgment results in NO, it is judged whether data has been input via a serial connection (step S205). If the judgment results in NO, a return is made to step 201.

On the other hand, if YES in step S202, it is judged whether the data received from the server apparatus 10 is encrypted data (step S206). If the judgment results in NO, the transition is immediately made to step S209. If the judgment results in YES, the encrypted data is transferred to the inside decryption circuit 701 in order to decrypt the encrypted data (step S207). Then, the decrypted data is extracted from this decryption circuit 701 (step S208), and a protocol header thereof is analyzed (step S209). Then, the drawing area (H×W) and the coordinates x, y extracted from this header are set in the register (step S210). Then, the header and the drawing data are set in the accelerator circuit 604 (step S211). Thus, after predetermined processing is performed in the accelerator circuit 604, the data is displayed on the display device 606.

Furthermore, if the judgment in step S203 results in YES, a key code corresponding to the operated keyboard is received (step S212). Then, transmission data is generated on the basis of this key code (step S213). Then, it is judged whether to encrypt this transmission data (step S214). If the judgment results in NO, the transition is immediately made to step S217. If the judgment in step S214 results in YES, the transmission data is transferred to and encrypted in the encryption circuit in the accelerator circuit 604 (step S215). Then, the encrypted transmission data is extracted from the encryption circuit (step S216), processed for a packet communication (step S217), and transferred to the server apparatus 10 in accordance with a transfer command (step S218). Subsequently, a return is made to step 201.

Still further, if the judgment in step S204 results in YES, control is performed to set data corresponding to the contents of the operation of the mouse or touch panel (step S219). Subsequently, the processing after step S213 is performed as in the case of the operation of the keyboard.

Further yet, if the judgment in step S205 results in YES, input data is received (step S220). Subsequently, the processing after step S213 is performed as in the case of the operation of the keyboard.

According to the embodiment described above, a load on the accelerator is determined in accordance with the drawing area of the client to optimize the allocation of the accelerator, such that the efficiency of the use of the accelerators can be increased. This enables an increase in the velocity of response to each client, as well as an increase in the number of clients to be connected.

Furthermore, the optimum accelerator is allocated to the client which has made a request depending on how the accelerators are used so that the loads on the accelerators are equal, thereby making it possible to increase the efficiency of the use of the accelerators. This enables an increase in the velocity of response to each client, as well as an increase in the number of clients to be connected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A server apparatus in a server-based computing system which transmits display data generated in the server apparatus to a thin client apparatus and which displays the display data on a display screen of the thin client apparatus, the server apparatus comprising:
    a plurality of accelerators, each of the plurality of accelerators being equipped with a difference detection circuit which compares the display data for a previous screen transmitted to the thin client apparatus with the display data for a current screen to be transmitted to the thin client apparatus to detect a difference therebetween;
    a transmission unit which transmits display data on a detected different portion in the display data for the current screen when compared with the display data for the previous screen to the thin client apparatus;
    a drawing area calculating unit which calculates, for each of the plurality of accelerators, a size of a drawing area to be allocated to each of the accelerators in response to a request from the thin client apparatus;
    a storage unit which stores the size of the drawing area which has been calculated in association with each of the accelerators allocated to each of the thin client apparatus; and
    an allocation unit which sums up the drawing area stored in the storage unit for each of the accelerators when a display request is made from a new thin client apparatus and allocates the accelerator having the lowest sum value to the new thin client apparatus which has made the display request.

2. The server apparatus according to claim 1, wherein the storage unit further has the number of colors of the drawing areas associated with the accelerators, and the drawing area calculating unit calculates the total number of colors for each of the accelerators.

3. A server control method in a server-based computing system which transmits display data generated in a server apparatus to a thin client apparatus and which displays the display data on a display screen of the thin client apparatus, the system including:
    a plurality of accelerators, each of the plurality of accelerators being equipped with a difference detection circuit which compares the display data for a previous screen transmitted to the thin client apparatus with the display data for a current screen to be transmitted to the thin client apparatus to detect a difference therebetween,
    the server control method comprising causing a computer of the server apparatus to function as:
    a transmission unit which transmits display data on a detected different portion in the display data for the current screen when compared with the display data for the previous screen to the thin client apparatus;
    a drawing area calculating unit which calculates, for each of the plurality of accelerators, a size of a drawing area to be allocated to each of the accelerators in response to a request from the thin client apparatus;
    a storage unit which stores the size of the drawing area which has been calculated in association with each of the accelerators allocated to each of the thin client apparatus; and
    an allocation unit which sums up the drawing area stored in the storage unit for each of the accelerators when a display request is made from a new thin client apparatus and allocates the accelerator having the lowest sum value to the new thin client apparatus which has made the display request.

4. The server control method according to claim 3, wherein the storage unit further has the number of colors of the drawing areas associated with the accelerators, and the drawing area calculating unit calculates the total number of colors for each of the accelerators.

* * * * *